United States Patent
Crews et al.

(10) Patent No.: US 8,188,015 B2
(45) Date of Patent: May 29, 2012

(54) METHODS AND COMPOSITIONS FOR FRACTURING SUBTERRANEAN FORMATIONS

(75) Inventors: James B. Crews, Willis, TX (US); Tianping Huang, Spring, TX (US); Allen D. Gabrysch, Houston, TX (US); James H. Treadway, Magnolia, TX (US); John R. Willingham, Cypress, TX (US); Patrick A. Kelly, Conroe, TX (US); William R. Wood, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/783,182

(22) Filed: May 19, 2010

(65) Prior Publication Data

US 2010/0261622 A1    Oct. 14, 2010

Related U.S. Application Data

(62) Division of application No. 11/679,018, filed on Feb. 26, 2007, now Pat. No. 7,723,272.

(51) Int. Cl.
*C09K 8/582* (2006.01)
*C09K 8/584* (2006.01)
*C09K 8/86* (2006.01)

(52) U.S. Cl. ........ 507/272; 507/201; 507/239; 507/240; 507/241; 507/244; 507/245; 507/260; 507/265; 507/269; 507/271; 166/246; 166/283; 166/305.1; 166/308.2

(58) Field of Classification Search .................. None
See application file for complete search history.

(56) References Cited

U.S. PATENT DOCUMENTS

| | | | |
|---|---|---|---|
| 5,807,812 A | 9/1998 | Smith et al. | |
| 5,858,928 A * | 1/1999 | Aubert et al. | 507/128 |
| 5,964,295 A | 10/1999 | Brown et al. | |
| 6,211,120 B1 * | 4/2001 | Welch et al. | 507/270 |
| 6,306,800 B1 | 10/2001 | Samuel et al. | |
| 6,506,710 B1 | 1/2003 | Hoey et al. | |

(Continued)

FOREIGN PATENT DOCUMENTS

| | | |
|---|---|---|
| GB | 2368602 A | 5/2002 |
| WO | 02070862 A1 | 9/2002 |

OTHER PUBLICATIONS

Schlumberger, "ClearFRAC HT Surfactant" Datasheet, Apr. 2005.
Schlumberger, "ClearFRAC HiPerm Surfactant" Datasheet, Aug. 2005.

(Continued)

*Primary Examiner* — John J Figueroa
(74) *Attorney, Agent, or Firm* — Mossman Kumar & Tyler PC

(57) ABSTRACT

Viscoelastic surfactant (VES) gelled aqueous fluids containing water, a VES, an internal breaker, a VES stabilizer, a fluid loss control agent and a viscosity enhancer are useful as treating fluids and particularly as fracturing fluids for subterranean formations. These VES-based fluids have faster and more complete clean-up than polymer-based fracturing fluids. The use of an internal breaker permits ready removal of the unique VES micelle based pseudo-filter cake with several advantages including reducing the typical VES loading and total fluid volume since more VES fluid stays within the fracture, generating a more optimum fracture geometry for enhanced reservoir productivity, and treating reservoirs with permeability above the present VES limit of approximately 400 md to at least 2000 md.

20 Claims, 11 Drawing Sheets

U.S. PATENT DOCUMENTS

| | | | |
|---|---|---|---|
| 6,599,863 B1 | 7/2003 | Palmer et al. | |
| 6,613,720 B1* | 9/2003 | Feraud et al. | 507/200 |
| 6,631,764 B2* | 10/2003 | Parlar et al. | 166/278 |
| 6,881,709 B2 | 4/2005 | Nelson et al. | |
| 7,036,585 B2 | 5/2006 | Zhou et al. | |
| 7,052,901 B2 | 5/2006 | Crews | |
| 7,060,661 B2 | 6/2006 | Dobson, Sr. et al. | |
| 7,081,439 B2* | 7/2006 | Sullivan et al. | 507/269 |
| 7,084,095 B2 | 8/2006 | Lee et al. | |
| 7,207,388 B2* | 4/2007 | Samuel et al. | 166/294 |
| 7,226,896 B2* | 6/2007 | Audibert-Hayet et al. | 507/267 |
| 7,265,079 B2* | 9/2007 | Willberg et al. | 507/203 |
| 7,527,102 B2 | 5/2009 | Crews et al. | |
| 2002/0076803 A1* | 6/2002 | Crews | 435/266 |
| 2003/0092581 A1* | 5/2003 | Crews | 507/100 |
| 2003/0234103 A1* | 12/2003 | Lee et al. | 166/293 |
| 2004/0106525 A1* | 6/2004 | Willberg et al. | 507/200 |
| 2005/0252658 A1 | 11/2005 | Willingham et al. | |
| 2006/0027369 A1 | 2/2006 | Baycroft et al. | |
| 2006/0041028 A1 | 2/2006 | Crews | |
| 2006/0211775 A1 | 9/2006 | Crews | |
| 2006/0211776 A1 | 9/2006 | Crews | |
| 2006/0258541 A1 | 11/2006 | Crews | |
| 2007/0056737 A1 | 3/2007 | Crews et al. | |
| 2007/0299142 A1* | 12/2007 | Crews et al. | 516/135 |

OTHER PUBLICATIONS

J. B. Crews, "Internal Phase Breaker Technology for Viscoelastic Surfactant Gelled Fluids," SPE 93449, 2005 SPE International Symposium on Oilfield Chemistry, Houston, Texas, Feb. 2-4, 2005.

R. Gdanski, et al., "Fracture Face Skin Evolution During Cleanup," SPE 101083, 2006 SPE Annual Technical Conference and Exhibition, San Antonio, Texas, Sep. 24-27, 2006.

J. A. Ayoub, et al., "New Results Improve Fracture Cleanup Characterization and Damage Mitigation," SPE 102326, 2006 SPE Annual Technical Conference and Exhibition, San Antonio, Texas, Sep. 24-27, 2006.

H. A. Nasr-El-Din, et al., "Lessons Learned and Guidelines for Matrix Acidizing with Viscoelastic Surfactants," SPE 102468, 2006 SPE Annual Technical Conference and Exhibition, San Antonio, Texas, Sep. 24-27, 2006.

H. A. Nasr-El-Din, et al., "Acid Fracturing of Deep Gas Wells Using a Surfactant-Based Acid: Long-Term Effects on Gas Production Rate," SPE 102469, 2006 SPE Annual Technical Conference and Exhibition, San Antonio, Texas, Sep. 24-27, 2006.

Clearfrac HT Web page, 2007, available at http://www.slb.com/content/services/stimulation/fracturing/clearfrac_ht.asp?.

Clearfrac HT Web page, 2007, available at http://www.slb.com/content/services/stimulation/fracturing/clearfrac_hiperm.asp?.

\* cited by examiner

METHODS AND COMPOSITIONS FOR FRACTURING SUBTERRANEAN FORMATIONS

CROSS-REFERENCE TO RELATED APPLICATION

This application is a divisional application from U.S. patent application Ser. No. 11/679,018 filed Feb. 26, 2007, issued May 25, 2010 as U.S. Pat. No. 7,723,272.

TECHNICAL FIELD

The present invention relates to aqueous gelled fluids used in subterranean formations during hydrocarbon recovery operations, and more particularly relates, in one embodiment, to aqueous fluids gelled with viscoelastic surfactants which also contain viscosity enhancers, fluid loss agents, VES stabilizers as well as internal components to "break" or reduce the viscosity of the gelled fluid after treatment, and methods of using these fluids as fracturing fluids.

TECHNICAL BACKGROUND

Hydrocarbons sometimes exist in a formation but cannot flow readily into the well because the formation has very low permeability. In order for hydrocarbons to travel from the formation to the wellbore there must be a flow path from the formation to the wellbore. This flow path is through the formation rock and has pores of sufficient size and number to allow a conduit for the hydrocarbons to move through the formation. In some subterranean formations containing hydrocarbons, the flow paths are of low incidence or occurrence and/or size that efficient hydrocarbon recovery is hampered.

With respect to wells that previously produced satisfactorily, a common reason for a decline in oil and gas production from a particular formation is damage to the formation that plugs the rock pores and impedes the flow of oil to the wellbore and ultimately to the surface.

Well stimulation refers to the various techniques employed to improve the permeability of a hydrocarbon-bearing formation. One common well stimulation technique is fracturing. Thickened fluids have applications in hydraulic fracturing and in other well stimulation techniques known to one of ordinary skill in the art. Hydraulic fracturing is a method of using pump rate and hydraulic pressure to fracture or crack a subterranean formation thereby creating a relatively large flow channel though which hydrocarbon can more readily move from the formation and into the wellbore. Once the crack or cracks are made, high permeability proppant, relative to the formation permeability, is typically pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons. When an acid is used in the fracturing fluid to increase or restore permeability to the formation, the treatment is term "acid fracturing" or "acid frac".

Conventionally, aqueous fracturing fluids have had their viscosities increased by incorporating hydratable polymers therein (e.g. polysaccharides), where some polymers may be crosslinked to increase viscosity even further. Recently it has been discovered that aqueous drilling and treating fluids may be gelled or have their viscosity increased by the use of non-polymeric viscoelastic surfactants (VES). These VES materials are in many cases advantageous over the use of polymer gelling agents used in the past in that they are comprised of low molecular weight surfactants rather than high molecular polymers whereby polymer accumulations (e.g. polymeric filter cake) can be avoided. Polymeric filter cakes formed on and within the formation can result in damage to the formation when the polymeric filter cakes are removed prior to hydrocarbon production, and this damage may result in reduced production of hydrocarbons. In contrast, viscoelastic type surfactants generate viscosity in aqueous fluids by forming unique elongated micelle arrangements. These unique arrangements have often been referred to as worm-like or rod-like micelles structures. Additionally, VES gelled aqueous fluids may exhibit very high viscosity at very low shear rates and under static conditions. It has been found that generally VES fluids do not damage formations to the extent that polymer gelled fluids do, although recent investigations have discovered that VES-gelled fluids may also damage formations to some extent upon their removal.

Little progress has been made toward developing internal breaker systems for the non-polymeric VES-based gelled fluids. Conventionally, VES gelled fluids have relied only on "external" or "reservoir" conditions for viscosity reduction (breaking) and VES fluid removal (clean-up) during hydrocarbon production. Additionally, over the past decade it has been found that reservoir brine dilution has only a minor, if any, breaking effect of VES gel within the reservoir.

Instead, only one reservoir condition is primarily and conventionally relied on for VES fluid viscosity reduction (gel breaking or thinning), and that has been the rearranging, disturbing, and/or disbanding of the VES worm-like micelle structure by contacting the hydrocarbons within the reservoir, more specifically contacting and mixing with crude oil and condensate hydrocarbons, as described in U.S. Pat. No. 5,964,295. In one non-limiting embodiment, it is believed that the gel or increased viscosity is imparted to the aqueous fluid by the worm-like or rod-like micelles becoming entangled with one another.

However, in many gas wells and in cases of excessive displacement of crude oil hydrocarbons from the reservoir pores during a VES gel treatment, results have shown many instances where VES fluid in portions of the reservoir are not broken or are incompletely broken resulting in formation damage (hydrocarbon production impairment). Contacting and breaking the viscous micelle-based fluid by reservoir hydrocarbons in all parts of the reservoir is not always effective. One viable reason is the exceptionally high viscosity that VES fluid can exhibit at very low shear rates and static conditions which makes the fluid difficult to move and remove from porous media (i.e. the pores of the reservoir). Hydrocarbon producing reservoirs typically have heterogeneous permeability, where VES fluid within the less permeable portions of the reservoir may be even more difficult to move and cleanup. The very high viscosity at very low shear rates can prevent uniform contacting and breaking of viscous VES fluid by the reservoir hydrocarbons. Channeling and by-passing of viscous VES fluid often occurs that results in impaired hydrocarbon production. In such cases post-treatment clean-up fluids composed of either aromatic hydrocarbons, alcohols, surfactants, mutual solvents, and/or other VES breaking additives have been pumped within the VES treated reservoir in order to try and break the VES fluid for removal. However, placement of clean-up fluids is problematic and normally only some sections of the reservoir interval are cleaned up, leaving the remaining sections with unbroken or poorly broken VES gelled fluid that impairs hydrocarbon production.

Because of this phenomenon and other occasions where reliance on external factors or mechanisms has failed to clean-up the VES fluid from the reservoir during hydrocarbon production, or in cases where the external conditions are slow acting (instances where VES breaking and clean-up takes a long time, such as several days up to possibly months) to break and then produce the VES treatment fluid from the reservoir, and where post-treatment clean-up fluids (i.e. use of external VES breaking solutions) are inadequate in removing unbroken or poorly broken VES fluid from all sections of the hydrocarbon bearing portion of the reservoir, there has been an increasing and important industry need for VES fluids to have internal breakers. Desirable internal breakers that should be developed include breaker systems that use products that are incorporated within the VES-gelled fluid that are activated by downhole temperature or another mechanism that will allow a controlled rate of gel viscosity reduction over a rather short period of time of about 1 to 16 hours or so, similar to gel break times common for conventional polymeric fluid systems.

A challenge has been that VES-gelled fluids are not comprised of polysaccharide polymers that are easily degraded by use of enzymes or oxidizers, but are comprised of surfactants that associate and form viscous rod- or worm-shaped micelle structures that exhibit very high apparent viscosity at very low fluid shear rates. Conventional enzymes and oxidizers have not been found to act and degrade the surfactant molecules or the viscous micelle structures they form. It is still desirable, however, to provide some mechanism that relies on and uses internal phase breaker components that will help assure complete viscosity break of VES-gelled fluids.

It would be desirable if a viscoelastic surfactant-based system could have the performance properties similar to or better than polymeric fluid for well treatment, particularly fracturing, but still be less damaging to the formation permeability and fracture conductivity common to VES treatment fluids. It would be even more desirable if a VES fluid system could have performance properties of polymeric fluid for well treatment, but additionally have superior clean-up character to conventional VES fluids used for well treatments, particularly fracturing. It would also be advantageous if a composition and method could be devised to overcome some of the problems in the conventional fracturing methods and fluids.

SUMMARY

There is provided in one non-restrictive version, a method for treating a subterranean formation that involves providing a viscoelastic surfactant gelled treating fluid composition. The treating fluid composition includes, but is not limited to, water, at least one viscoelastic surfactant (VES) in an effective amount to increase the viscosity of the water, at least one internal breaker, and at least one fluid loss control agent. The treating fluid composition is introduced into the subterranean formation. The subterranean formation is treated. The viscosity of the treating fluid composition is reduced. Some reduction of the viscosity may occur simultaneously with the treating.

There is also provided, in another non-limiting form, a method for fracturing a subterranean formation that involves introducing a viscoelastic surfactant gelled fracturing fluid composition into a subterranean formation. The viscoelastic surfactant gelled fluid may include, but is not necessarily limited to, water, brine, at least one viscoelastic surfactant (VES) in an amount effective to increase the viscosity of the water, at least one internal breaker, at least one fluid loss control agent, optionally at least one VES stabilizer for high temperature application, and optionally at least one viscosity enhancer. The method further involves pumping the fracturing fluid composition against the subterranean formation at sufficient rate and pressure to fracture the formation. The efficiency of the fluid to generate the desired fracture geometry is improved by the use of the fluid loss control and viscosity enhancer agents herein. After fracturing, the viscosity of the VES gelled fluid is reduced with the internal breaker. In one non-limiting embodiment, the internal breaker is believed to preferably associate with the hydrocarbon tail section of VES micelle and thereby mostly resides within the rod-like micelles.

Alternatively there is provided in one non-restrictive embodiment a viscoelastic surfactant gelled subterranean formation treatment fluid that includes, but is not limited to, water, at least one VES in an amount effective to increase the viscosity of the water, at least one internal breaker, at least one fluid loss control agent, optionally at least one VES stabilizer for high temperature application, and optionally at least one viscosity enhancer.

DETAILED DESCRIPTION

Figure 1:
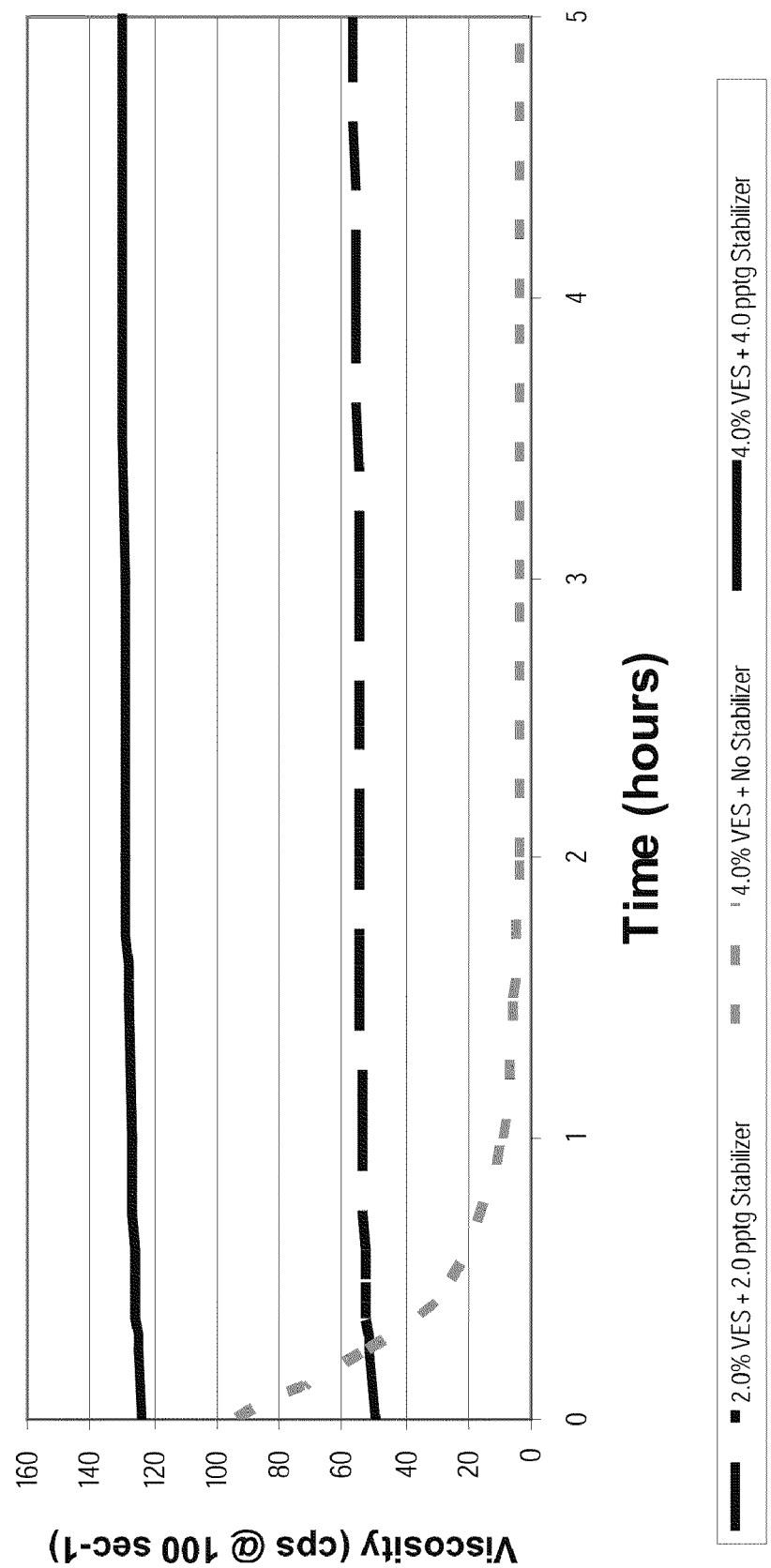
FIG. 1 is a graph of the viscosity of a VES gelled fluid, 14.2 ppg (1.7 kg/liter) $CaCl_2/CaBr_2$ brine with 2% and 4% by volume (bv) WG-3L VES at 275° F. (135° C.) and having 2.0 and 4.0 pptg (0.24 and 0.48 kg/m$^3$, respectively) VES-STA1 viscosity stabilizer, as a function of time.

Most hydraulic fracturing treatments use crosslinked polymer fluid systems. These systems control fluid leak-off and carry proppant well, but they are wall-building fluids which leave polymer accumulation on the formation face (i.e. filter cake) and within the fracture which impairs both the formation-face permeability and the proppant-pack conductivity. The concentration of the breaker to break long polysaccharide chain in crosslinked polymer fluid systems is based on homogeneous media (i.e. a breaker that is distributed throughout the fluid within the confined lab test container). In the proppant packed fracture, most of the breaker is leaked off with the filtrate into the formation matrix and leaves behind dehydrated polymer unbroken, and the conductivity of the proppant packed fracture is remarkably damaged.

Viscoelastic surfactant (VES) based fluid systems have been used for fracturing for over a decade. VES fluids are composed of low molecular weight surfactants that form elongated micelle structures which exhibit viscoelastic behavior to increase fluid viscosity. VES fluids are unlike polymer-based systems in that they are non-wall building and do not form filter cake on the formation face. Without filter cake development, the amount of VES fluid that leaks off from the fracture during a fracturing treatment is primarily fluid viscosity dependent. VES fluids may exhibit relatively high fluid leak-off from the fracture during a treatment and "screening out" is a common problem. Because of very poor fluid efficiency, (1) the permeability of a reservoir may be limited to about 800 md, and in most cases is limited to less than about 400 md, (2) more total fluid volume is required for a given treatment, and (3) larger amounts of "leaked-off fluid" within the reservoir matrix occurs which needs to be removed (cleaned up) after treatment. Additionally, conventional VES fluids have not contained internal breakers. That is, they have depended upon reservoir hydrocarbons to contact, break, and clean up the leaked-off VES fluid. However, there are many cases where reliance on external breaking agents (contacting reservoir hydrocarbons, especially in gas wells) does not result in uniform or complete removal of VES fluids from the treated reservoir after a fracturing treatment and impaired production occurs. In many cases post treatment clean-up fluids that contain VES breaking agents (such as alcohols and mutual solvents) have been required to remove unbroken VES fluid within the hydrocarbon producing formation. Post treatment clean-up fluids seldom, if ever, have uniform coverage to contact and remove all unbroken VES fluid from the reservoir. Recent publications (SPE 102468 and SPE 102469) have shown cases that without internal breakers VES fluids may generate the same formation damage that polymer-gelled fluids do. Depending on the hydrocarbon in the producing reservoir (the porous medium) in every case to contact the VES micelles to break the VES fluid may be very questionable.

New methods and compositions for fracturing hydrocarbon producing reservoirs have been discovered that will overcome many of the disadvantages of polymers while significantly improving the benefits of using VES fluids. The compositions of the fracturing fluids herein is a synergistic combination of internal breakers with one or more high temperature optional stabilizers, optional viscosity enhancers, fluid loss control agents, and mix water brines up to 14.4 ppg salinity (1.7 kg/liter), e.g. $CaBr_2$. The internal breakers described herein surprisingly work in the presence of several types of VES micelle stabilizers, micelle viscosity enhancers, micelle fluid loss control agents, a wide range of mix water salinity (including divalent ions like calcium and magnesium) for fluid temperature applications ranging from about 80° F. to about 300° F. (about 27 to about 149° C.). The ability of these agents to work together by compatible mechanisms is remarkably unique and allows the many enhanced VES fluid performance properties to be combined.

The fluid loss control agents herein are those that produce a novel "pseudo-filter cake", that is, a highly viscous layer of VES fluid composed of unique particles associating with VES micelles on the core and formation faces. The ability to generate "pseudo-filter cake" will significantly reduce the rate of VES fluid leak-off, similar to the polymeric-type filter cakes but through the use of completely different mechanisms than conventional polymer filter cakes. The pseudo-filter cake has leak-off control performance similar to or analogous to polymeric-type filter cake, yet the clean-up of the pseudo-filter cake is far superior to that of conventional polymeric filter cake. In polymer filter cake, most of the breaker in the polymer fluid system is leaked-off into the formation matrix and leaves a high concentration of polymer in the cake (fracture). The breaker is not attached to or connected with the polymer. In VES pseudo-filter cake, the internal breaker appears to be contained or resident inside of VES micelles and thus goes wherever VES micelles go, in one non-limiting explanation. The fluid loss control agents may work from about 80° F. to about 300° F. (about 27 to about 149° C.). A wide range of particle types and properties have been found of utility to improve the performance of the VES fluid, which includes, but is not necessarily limited to, surface adsorption, crystal surface charges, piezoelectric and pyroelectric particles, and nano-sized particle properties and technology. Additionally, the synergistic use of internal breakers with the pseudo-filter cake has been discovered to allow the pseudo-filter cake to be readily degraded into an easily producible broken VES fluid. Another improved performance feature is how the fluids herein, a portion of which may inevitably leak-off into the pores of the reservoir during a treatment, can carry with it internal breaker that converts the VES fluid into an easily producible fluid without the need for contacting reservoir hydrocarbons. This is a significant improvement over conventional methods and compositions, which, without contacting hydrocarbons, exhibit very high viscosity at very low shear rates, such as 2000 cps or more at 1 sec$^{-1}$ shear rate. The very high viscosity of VES fluids at very low shear rates makes the leaked-off VES fluid within the pores of the formation require higher reservoir pressure in order to move and remove (clean up) the fluid within the reservoir matrix. Laboratory core clean-up tests have shown that very little pressure and time is required to remove internally broken VES from the pore matrix of Berea cores as compared to VES fluids without an internal breaker.

VES gelled aqueous fluids may exhibit very high viscosity at very low shear rates and under static conditions. The exceptionally high viscosity at low shear rates, often in thousands of centipoise, can make the VES gelled fluid very difficult to move and displace from the pores and fractures of the formation which can be ideal for fracturing fluids. However, while the very high viscosity at very low shear rate may be good for fracturing fluids, this in turn may make VES-based fracturing fluids hard to clean up. Thus, it is important that the viscosity of any VES-based fracturing fluid be reduced or broken in some manner so that it may be easily and quickly flowed back from the formation.

Figure 2:
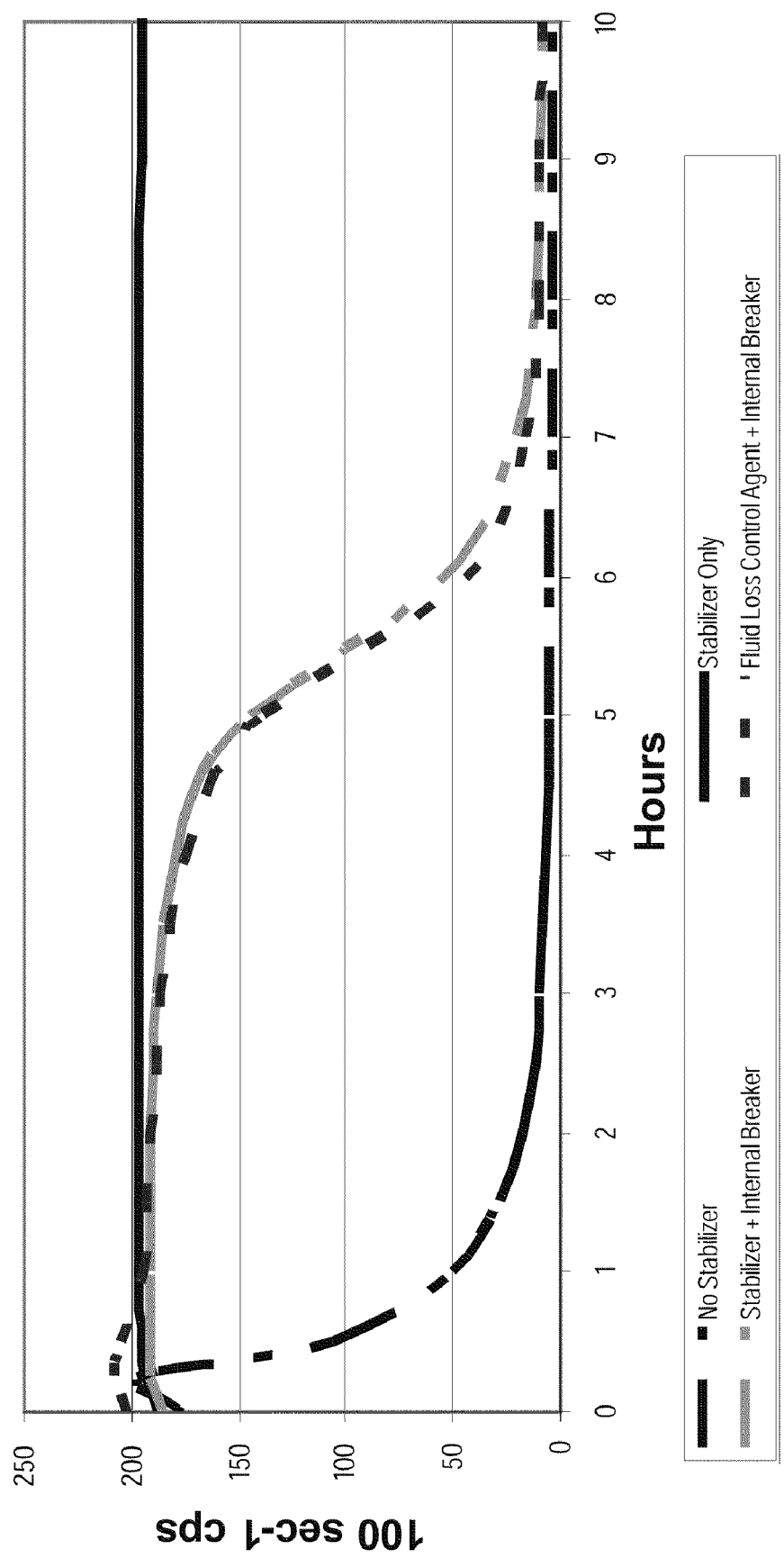
FIG. 2 is a graph of the viscosity of VES gelled fluids in 13.0 ppg (1.6 kg/liter) $CaCl_2/CaBr_2$ brine with 4% by volume (bv) WG-3L VES at 250° F. (121° C.) having no viscosity stabilizer, 6.0 pptg (0.72 kg/m$^3$) VES-STA 1 viscosity stabilizer, 6.0 pptg (0.72 kg/m$^3$) VES-STA 1 viscosity stabilizer and 2.0 gptg Fish Oil 18:12 TG as internal breaker, and 10 gptg (gallons per thousand gallons) FLC-40L (FLC-40L is slurried MgO powder mixed in monopropylene glycol) as viscosity stabilizer and fluid loss control agent and 2.0 gptg Fish Oil 18:12 TG as internal breaker, as a function of time.
Figure 4:
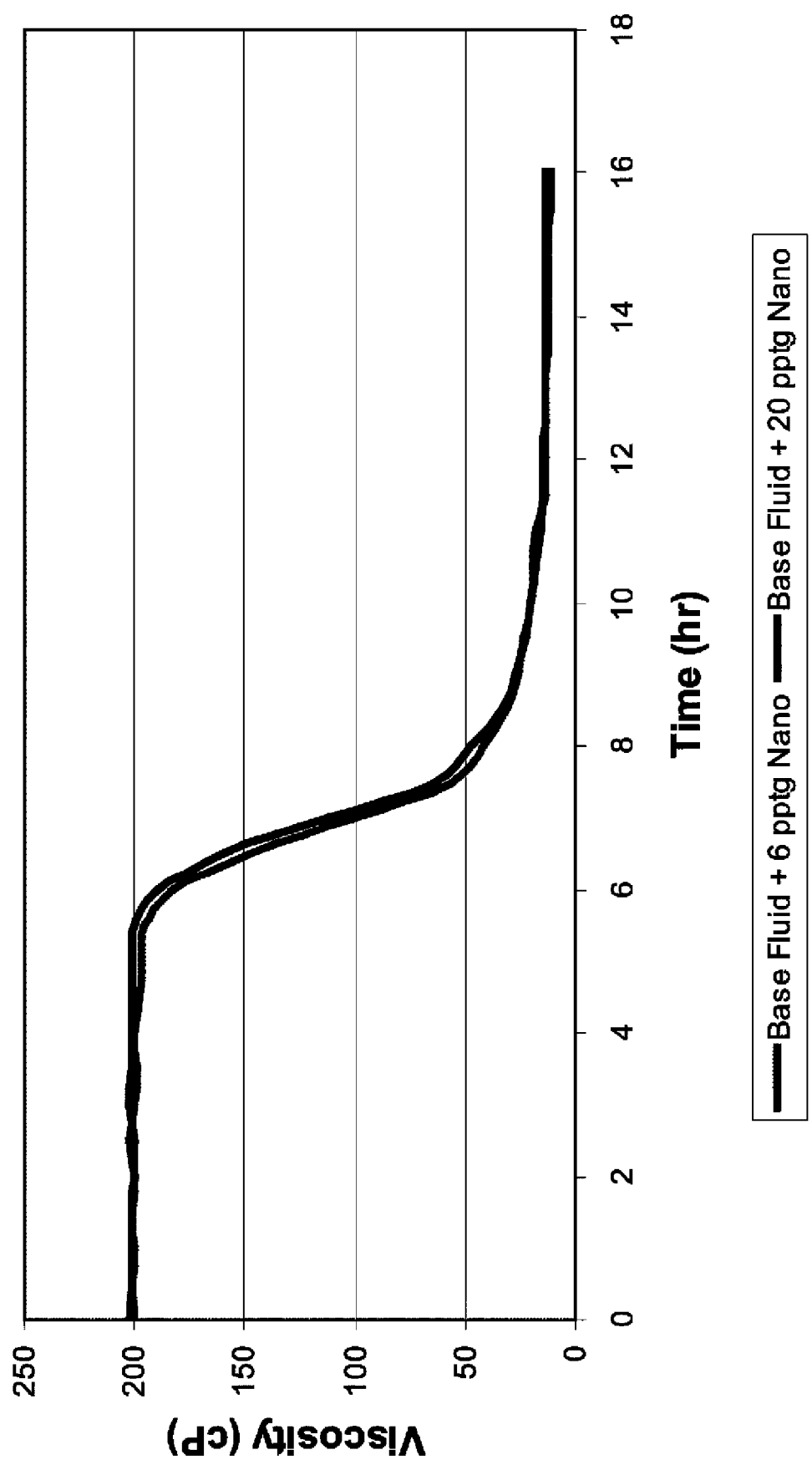
FIG. 4 is a graph of the viscosity of VES gelled fluids in 13.0 ppg (1.6 kg/liter) $CaCl_2/CaBr_2$ brine with 4% by volume (bv) WG-3L VES at 250° F. (121° C.) having 6.0 pptg (0.72 kg/m$^3$) nano-sized MgO as a viscosity stabilizer with 1.5 gptg Fish Oil 18:12 TG as internal breaker, and having 20.0 pptg (2.4 kg/m$^3$) nano-sized MgO as a viscosity stabilizer and fluid loss control agent with 1.5 gptg Fish Oil 18:12 TG as internal breaker, as a function of time.

A viscoelastic surfactant-internal breaker aqueous fluid system containing viscosity enhancers, VES stabilizers for high temperature, and fluid loss control agents and methods for using the systems for fracturing subterranean formations penetrated by a well bore have been discovered. A viscous gel starts to develop when the viscoelastic surfactant (VES) is mixed with an aqueous base fluid. A salt or other counterion may be used in the aqueous fluid containing VES to help promote viscous micelle formation. The VES-based fracturing fluid is pumped in one or more sequential stages. The stages of viscoelastic surfactant gelled fluid (that contains the mineral oil and/or fish oil, transition metal ion source, saponified fatty acid, unsaturated or saturated fatty acid or other internal breaker, e.g.) maintains a high viscosity prior to fracturing and eventual breaking (viscosity reduction) of the fluid through action of the breaker. The viscosity of the VES gelled fluid is particularly improved, increased or enhanced, particularly at low shear rates, by the presence of particulate viscosity enhancers. The rate of fluid leak-off during a fracturing treatment is also significantly reduced by the presence of particulate fluid loss control agents. Further, the viscosity stability of the VES-gelled fluid may be improved or enhanced by the presence of particulate high temperature viscosity stabilizing agents. The viscosity enhancers, viscosity stabilizers, and fluid loss control agents, further improve the ability of the VES-based aqueous fluid to fracture formations, and each work by a mechanism that does not inhibit the activity or mechanism of the other. In one non-limiting example, the presence of a high temperature viscosity stabilizer does not inhibit the activity of the internal breakers, as seen in FIGS. 2 and 4. In another non-limiting example, the presence and activity of a fluid loss control agent does not inhibit the breaking activity of an internal breaker, as also seen in FIGS. 2 and 4. After completion of the pumping treatment and shut-in of the well, the internal breaker (e.g. mineral oil and/or fish oil) breaks the viscous gel, i.e. lowers the viscosity of the fracturing fluid readily and easily in the presence of the viscosity stabilizers, viscosity enhancers, and the like. The internally broken VES fluid is very easy to flow back with the producing fluid, leaving little or no damage to the formation. Very little reservoir pressure and time is required to produce and clean up the broken VES fluid. No reliance on reservoir hydrocarbons is required to contact and clean up the VES fracturing fluid. Because of their nanometer size and the minute amount used, the particulate viscosity enhancers and stabilizers are also readily producible and will readily clean-up and flowback with the broken VES fluid, leaving little to no particulate damage to the formation.

Although in one non-limiting embodiment, certain materials or components used for fluid loss control agents may also function as viscosity stabilizers and/or viscosity enhancers, in another non-restrictive embodiment, it will be appreciated that the fluid loss control agents used are different from the viscosity stabilizers used, and in turn the viscosity enhancers employed are different from either the fluid loss control agents and viscosity stabilizers employed.

As noted, aqueous fluids gelled with viscoelastic surfactants have been previously used in wellbore completions, such as hydraulic fracturing, without the use of an internal breaker system, and typically rely on external downhole conditions for the VES-gelled fluid to break, such as dilution with reservoir brine and more importantly gel breaking through interaction with reservoir hydrocarbons during production of such reservoir fluids to the surface. However, reliance on external downhole conditions has showed instances where unbroken or poorly broken VES fluid remains within the reservoir after a VES fluid treatment and has impaired hydrocarbon production. There are aqueous fluids gelled with viscoelastic surfactants that are known to be "broken" or have their viscosities reduced, although some of the known breaking methods utilize external clean-up fluids as part of the treatment design (such as pre- and post-flush fluids placed within the reservoir before and after well completion treatments, such as conventional gravel packing and also "fracpacking"—hydraulic fracturing followed by gravel packing treatment). There are other known methods, but they are relatively slow—for instance the use of VES-gel breaking bacteria with fluid viscosity break times ranging from half a day up to 7 days. There has evolved in the stimulation fluid art an industry standard need for "quick gel break", but for VES-gelled fluids this has been a substantially challenging problem. There needs to be a method for breaking VES-gelled fluids that can be as easy, as quick, and as economic as breaking conventional polymeric fluids, preferably using an internal breaker. At the same time, it is not desirable to reduce the viscosity of the fluid, i.e. break the gel, immediately or essentially instantaneously. Of considerable concern is the fact than an unbroken VES fluid has exceptionally high viscosity at very low shear rate and static conditions which makes it difficult for reservoir hydrocarbons to contact all of the VES fluid and to displace it from the pores of a treated reservoir. This is particularly true for gas reservoirs and crude oil reservoirs that have heterogeneous permeability with high relative permeability sections present.

New methods have been discovered to reduce the viscosity of aqueous fluids gelled with viscoelastic surfactants (i.e. surfactants that develop viscosity in aqueous brines, including chloride brines, by formation of rod- or worm-shaped micelle structures). The new methods remove the need or reliance on reservoir hydrocarbons to contact, break, and cleanup the viscoelastic fluid. The improvements will allow relatively very quick breaks, such as within 1 to about 16 hours, compared to using bacteria to break VES which takes at least 48 or more hours, and more typically 4 to 7 days. In another non-limiting embodiment the break occurs within about 1 to about 8 hours; alternatively from about 1 to about 4 hours, and in another non-restrictive version about 1 to about 2 hours. The breaker components herein can be used as an internal breaker, e.g. added to the gel after batch mixing of a VES-gel treatment, or added on-the-fly after continuous mixing of a VES-gel treatment using a liquid additive metering system in one non-limiting embodiment, or the components can be used separately, if needed, as an external breaker solution to remove VES gelled fluids already placed downhole. Internal breakers suitable for the methods and compositions herein include transition metal ion sources, reducing agent sources, chelating agent sources, alkali metal sources, alkaline earth metal sources, saponified fatty acids, mineral oils, hydrogenated polyalphaolefin oils, saturated fatty acids, unsaturated fatty acids and combinations thereof. Bacteria may also be used alone or conjunction with these other internal breakers, although as noted, reducing the viscosity of VES gelled fluids with bacteria is relatively slow. The use of bacteria as a viscosity breaker for VES gelled fluids is described in U.S. Pat. No. 7,052,901 to Baker Hughes, incorporated herein in its entirety by reference.

The internal breakers (e.g. mineral oils, hydrogenated polyalphaolefin oils, saturated fatty acids, polyunsaturated fatty acids, and the like) are not solubilized in the brine, since they are inherently hydrophobic, but rather interact with the VES surfactant worm-like micelle structures initially as dispersed microscopic oil droplets and thus form an oil-in-water type emulsion where the oil droplets are dispersed in the "internal phase" as a "discontinuous phase" of the brine medium/VES fluid which is the "outer phase" or "continuous phase". Laboratory tests have shown that small amounts of unsaturated fatty acids, enough to eventually completely the break VES viscosity, will not spontaneously degrade VES viscosity upon individual association and dispersion within the VES micelles, but will become active to degrade VES viscosity upon activation, such as auto-oxidation of the fatty acids to products that disrupt the elongated, "rod-like" or "worm-like" micelles.

Surprisingly and unexpectedly the method may employ one or more mineral oil (as a non-limiting example of a suitable breaker) as the breaking component. This is surprising because, as previously discussed, the literature teaches that contact of a VES-gelled fluid with hydrocarbons, such as those of the formation in a non-limiting example, essentially instantaneously reduces the viscosity of the gel or "breaks" the fluid. By "essentially instantaneously" is meant less than one-half hour. The rate of viscosity break for a given reservoir temperature by the methods described herein is influenced by type and amount of salts within the mix water (i.e. seawater, KCl, NaBr, $CaCl_2$, $CaBr_2$, $NH_4Cl$ and the like), presence of a co-surfactant (i.e. sodium dodecyl sulfate, sodium dodecyl benzene sulfonate, potassium laurate, potassium oleate, sodium lauryl phosphate, and the like), VES type (i.e. amine oxide, quaternary ammonium salt, and the like), VES loading, the amount of breaker (e.g. mineral oil) used, the distillation range of the mineral oil, its kinematic viscosity, the presence of components such as aromatic hydrocarbons, and the like.

It is important to add the lower molecular weight mineral oils after the VES product is added to the aqueous fluid. However, for higher molecular weight mineral oils, types like GLORIA® and HYDROBRITE® 200 from Crompton Corporation, they may be added before, during or after the VES product addition. Mineral oil (also known as liquid petrolatum) is a by-product in the distillation of petroleum to produce gasoline. It is a chemically inert transparent colorless oil composed mainly of linear, branched, and cyclic alkanes (paraffins) of various molecular weights, related to white petrolatum. Mineral oil is produced in very large quantities, and is thus relatively inexpensive. Mineral oil products are typically highly refined, through distillation, hydrogenation, hydrotreating, and other refining processes, to have improved properties, and the type and amount of refining varies from product to product. Highly refined mineral oil is commonly used as a lubricant and a laxative, and with added fragrance is marketed as "baby oil" in the U.S. Most mineral oil products are very inert and non-toxic, and are commonly used as baby oils and within face, body and hand lotions in the cosmetics industry. Other names for mineral oil include, but are not necessarily limited to, paraffin oil, paraffinic oil, lubricating oil, base oil, white mineral oil, and white oil.

In one non-limiting embodiment the mineral oil is at least 99 wt % paraffinic. Because of the relatively low content of aromatic compounds, mineral oil has a better environmental profile than other oils. In general, the more refined and less aromatic the mineral oil, the better. In another non-restrictive version, the mineral oil may have a distillation temperature range from about 160 to about 550° C., alternatively have a lower limit of about 200° C. and independently an upper limit of about 480° C.; and a kinematic viscosity at 40° C. from about 1 to about 250 cSt, alternatively a lower limit of about 1.2 independently to an upper limit of about 125 cSt. Specific examples of suitable mineral oils include, but are not necessarily limited to, BENOL®, CARNATION®, KAYDOL®, SEMTOL®, HYDROBRITE® and the like mineral oils available from Crompton Corporation, ESCAID®, EXXSOL® ISOPAR® and the like mineral oils available from Exxon-Mobil Chemical, and similar products from other mineral oil manufacturers. The ESCAID 110® and Conoco LVT-200® mineral oils have been well known components of oil-based drilling muds and the oil industry has considerable experience with these products, thus making them an attractive choice. The mineral oils from ConocoPhillips Company with their high purity and high volume use within other industries are also an attractive choice.

It has been discovered in breaking VES-gelled fluids prepared in monovalent brines (such as 3% KCl brine) that at temperatures below about 180° F. (82° C.) ESCAID® 110 works well in breaking VES-gelled fluids, and that at or above about 140° F. (60° C.) HYDROBRITE® 200 works well. The use of mineral oils herein is safe, simple and economical. In some cases for reservoir temperatures between about 120° to about 240° F. (about 49° to about 116° C.) a select ratio of two or more mineral oil products, such as 50 wt % ESCAID® 110 to 50 wt % HYDROBRITE® 200 may be used to achieve controlled, fast and complete break of a VES-gelled fluid.

It has also been discovered that type and amount of salt within the mix water used to prepare the VES fluid (such as 3 wt % KCl, 21 wt % $CaCl_2$, use of natural seawater, and so on) and/or the presence of a VES gel stabilizer (such as VES-STA 1 available from Baker Oil Tools) may affect the activity of a mineral oil in breaking a VES fluid at a given temperature. For example, ESCAID® 110 at 5.0 gptg will readily break the 3 wt % KCL based VES fluid at 100° F. (38° C.) over a 5 hour period. ESCAID® 110 also has utility as a breaker for a 10.0 ppg $CaCl_2$ (21 wt % $CaCl_2$) based VES fluid at 250° F. (121° C.) when a VES stabilizer (2.0 pptg VES-STA 1) is included. More information about using mineral oils, hydrogenated polyalphaolefin oils and saturated fatty acids as internal breakers may be found U.S. Pat. No. 7,347,266, incorporated by reference herein in its entirety.

In one non-limiting embodiment these gel-breaking products or breakers work by rearrangement of the VES micelles from rod-shaped or worm-shaped elongated structures to spherical structures. The breaking components described herein may also include the unsaturated fatty acid or polyenoic and monoenoic components of U.S. Pat. No. 7,645,724, incorporated herein in its entirety by reference. In one non-limiting embodiment these unsaturated fatty acids (e.g. oleic, linoleic, linolenic, eicosapentaenoic, etc.) may possibly be used alone—in oils they are commonly found in (flax oil, soybean oil, etc), and can be provided as custom fatty acid blends (such as Fish Oil 18:12 TG by Bioriginal Food & Science Corp.)—or used together with the mineral oils herein. In another non-limiting embodiment, natural saturated hydrocarbons such as terpenes (e.g. pinene, d-limonene, etc.), saturated fatty acids (e.g. lauric acid, palmitic acid, stearic acid, etc. from plant, fish and/or animal origins) and the like may possibly be used together with or alternatively to the mineral oils herein. In some cases it is preferred that the plant or fish oil be high in polyunsaturated fatty acids, such as flax oil, salmon oil, and the like. The plant and fish oils may be refined, blended and the like to have the desired polyunsaturated fatty acid composition modified for the compositions and methods herein. Other refinery distillates may potentially be used in addition to or alternatively to the mineral oils described herein, as may be hydrocarbon condensation products. Additionally, synthetic mineral oils, such as hydrogenated polyalphaolefins, and other synthetically derived saturated hydrocarbons may be of utility to practice the methods herein.

In one non-limiting embodiment, the breaking or viscosity reduction is triggered or initiated by heat. These mineral, plant, and animal oils will slowly, upon heating, break or reduce the viscosity of the VES gel with the addition of or in the absence of any other viscosity reducing agent. The amount of internal breaker (mineral oil, e.g.), needed to break a VES-gelled fluid may in some cases be temperature dependent, with less needed as the fluid temperature increases. For mineral oil, the kinematic viscosity, molecular weight distribution, and amount of impurities (such as aromatics, olefins, and the like) also appear to influence the rate in which a mineral oil will break a VES-gelled fluid at a given temperature. For unsaturated fatty acid oils the type and amount of unsaturation (i.e. double carbon bonds) appears to be the major influence on the rate at which the fatty acid oil will break the VES-gelled fluid at a given temperature. Once a fluid is completely broken at an elevated temperature and cooled to room temperature a degree of viscosity reheal may occur but in most cases no rehealing is expected. The effective amount of mineral oil, plant oil and/or fish oil ranges from about 0.1 to about 20 gptg based on the total fluid, in another non-limiting embodiment from a lower limit of about 0.5 gptg, where "total fluid" means overall VES gelled fluid with all components of the particular embodiment. Independently the upper limit of the range may be about 12 gptg based on the total fluid. (It will be appreciated that units of gallon per thousand gallons (gptg) are readily converted to SI units of the same value as, e.g. liters per thousand liters, $m^3/1000\,m^3$, etc.)

Controlled viscosity reduction rates can be achieved at a temperature of from about 70° F. to about 400° F. (about 21 to about 204° C.), and alternatively at a temperature of from about 100° F. independently to an upper end of the range of about 280° F. (about 38 to about 138° C.), and in another non-limiting embodiment independently up to about 300° F. (149° C.). In one non-limiting embodiment, the fluid designer would craft the fluid system in such a way that the VES gel would break at or near the formation temperature after fracturing was accomplished.

In one non-limiting embodiment, fluid internal breaker design would be based primarily on formation temperature, i.e. the temperature the fluid will be heated to naturally in the formation once the acidizing treatment is over. Fluid design may take into account the expected duration or exposure of the fluid at formation temperature during a treatment. In the middle to latter acidizing stages the treating fluid may only experience actual reservoir temperature for 10% to 50% of the job time, since such fluids are pumped towards the end of the acidizing treatment and will contact the reservoir for a relatively shorter period of time. There would generally be no additional temperature or heating the VES fluid would see or experience other than original reservoir temperature.

Figure 8:
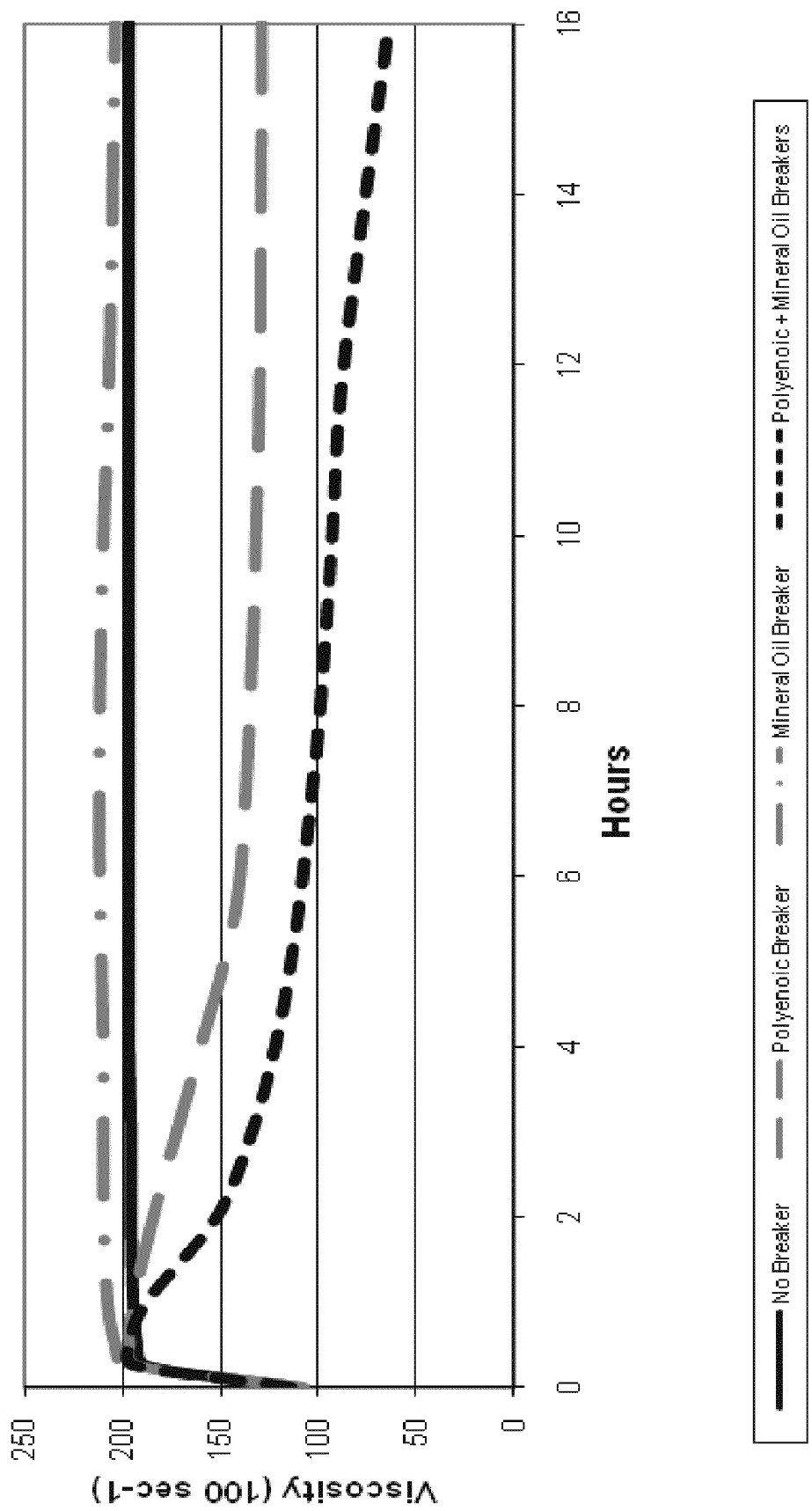
FIG. 8 is a graph of the viscosity of VES gelled fluids in 9% bw KCl brine with 6% by volume (bv) WG-3L VES and 5 gptg FLC-40L (slurried MgO powder mixed with monopropylene glycol) as fluid loss control agent at 134° F. (57° C.) having no internal breaker, 6.0 gptg HYDROBRITE 200® internal breaker, 6.0 gptg Fish Oil 18:12 TG with 0.3 gptg GBC-4L as internal breaker, and 6.0 gptg HYDROBRITE® 200 with 6.0 gptg Fish Oil 18:12 TG and 0.3 gptg GBC-4L combination of internal breakers, as a function of time.
Figure 9:
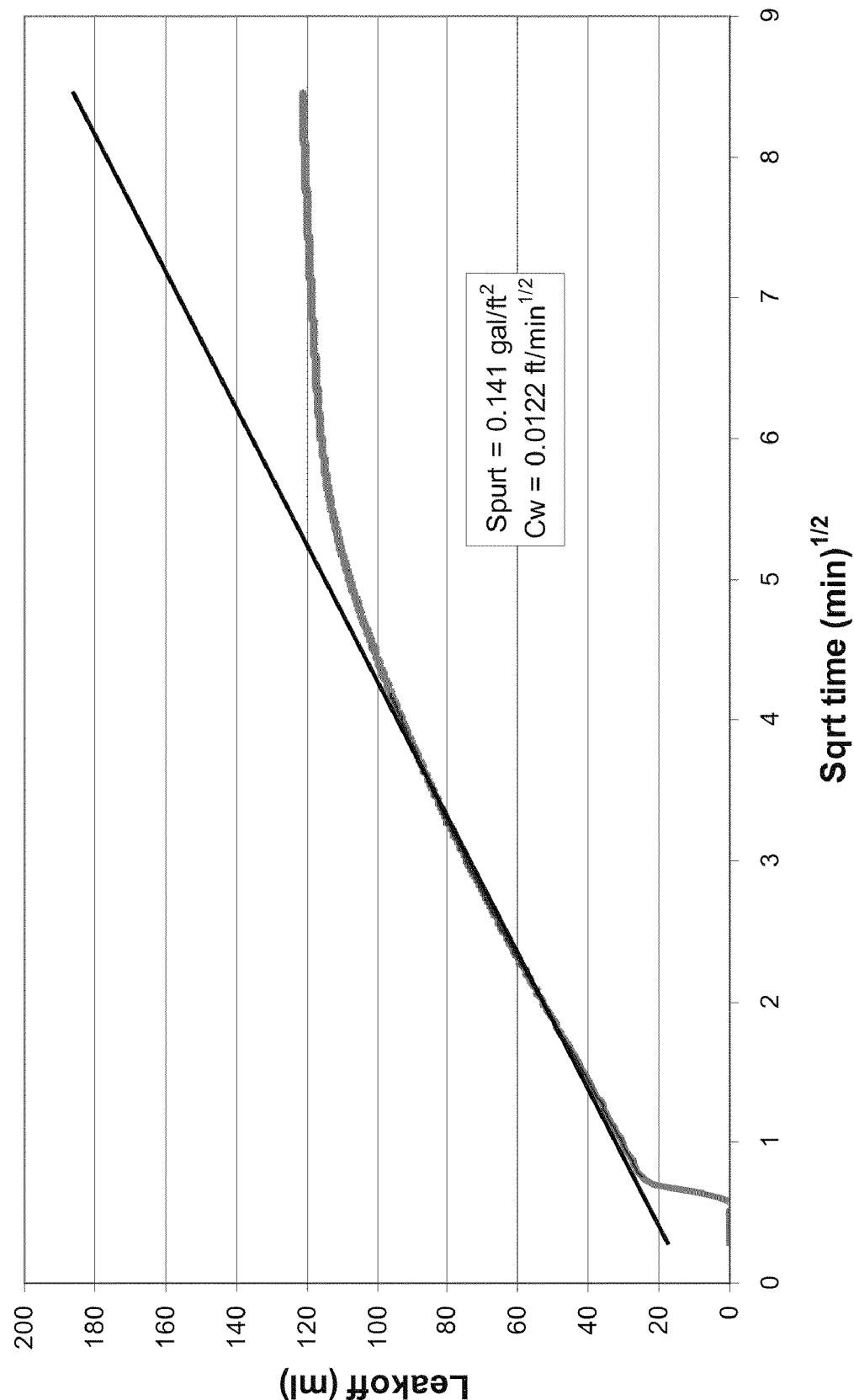
FIG. 9 is a graph of the fluid leak-off of VES gelled fluid in 9% bw KCl brine with 6% by volume (bv) WG-3L VES and 5 gptg FLC-40L at 134° F. (57° C.) having 6.0 gptg HYDROBRITE® 200 with 6.0 gptg Fish Oil 18:12 TG and 0.3 gptg GBC-4L combination of internal breakers, as a function of time.

In another non-limiting example, a combination of internal breakers may have synergistic results, that is, the breaking profile of the fluid over time is improved when two types of internal breakers are used rather only one or the other. As shown in FIG. 8, the use of mineral oil alone, like the use of metal enhanced polyenoic breaker alone, does not give the rate and degree of viscosity reduction over time as does the combination of mineral oil with metal enhanced polyenoic breaker. By using combinations of internal breakers, both the initial and final break of the VES fluid may be customized, that is, have improved overall breaking performance. In view of the data in FIG. 8, one breaker mechanism appears to help speed up the other breaker mechanism. Surprisingly, even with two internal breaker mechanisms present in the VES fluid, the novel pseudo-filter cake with fluid loss control agent still shows excellent fluid loss control, as shown in FIG. 9. The fluid formulation in FIG. 9 is the same as that used for FIG. 8.

It is sometimes difficult to specify with accuracy in advance the amount of the various breaking components that should be added to a particular aqueous fluid gelled with viscoelastic surfactants to sufficiently or fully break the gel, in general. For instance, a number of factors affect this proportion, including but not necessarily limited to, the particular VES used to gel the fluid; the particular breaker used (e.g. mineral, plant, and/or fish oil, unsaturated fatty acid, etc.); the temperature of the fluid; the downhole pressure of the fluid, the starting pH of the fluid; and the complex interaction of these various factors. Nevertheless, in order to give an approximate idea of the proportions of the various breaking components to be used in the methods herein, approximate ranges will be provided. In an alternative, non-limiting embodiment the amount of mineral oil that may be effective in the invention may range from about 5 to about 25,000 ppm, based on the total amount of the fluid. In another non-restrictive version of the invention, the amount of mineral oil may range from a lower end of about 50 independently to an upper end of about 12,000 ppm.

The use of transition metal ion sources as breakers for VES-gelled fluids is more fully described in U.S. Pat. No. 7,595,284, incorporated by reference herein in its entirety. Briefly, the transition metal ion source used as an internal breaker may include a transition metal salt or transition metal complex, where the transition metal may be from Groups VA, VIA, VIIA, VIIIA, IB, IIB, IIIB, and IVB of the Periodic Table (previous IUPAC American Group notation). One or more chelating agents and/or one or more reducing agent sources may also be used in conjunction with the transition metal ion sources as breaking agents. In one non-limiting embodiment, the amount of transition metal ion from the transition metal ion source ranges from about 0.01 to about 300 ppm, based on the total fluid.

The use of saponified fatty acids as breakers for VES gelled aqueous fluids is more fully described in U.S. Ser. No. 11/372,624 filed Mar. 10, 2006, published as U.S. Patent Application Publication 2006/0211775, incorporated by reference herein in its entirety. Briefly, the saponified fatty acids are soap reaction products of a fatty acid with an alkaline compound selected from the group consisting of organic bases, alkali metal bases, alkaline earth metal bases, ammonium bases, and combinations thereof. The soap reaction products may be pre-formed prior to addition as an internal breaker, or may be formed in situ. Suitable fatty acids include, but are not limited to those found in plant oils and animal oils. Suitable alkali metal bases, alkaline earth metal bases and ammonium bases include, but are not necessarily limited to oxides and hydroxides of cations of the group including Na, K, Cs, Ca, Mg, Ba, Fe, Mn, Cu, Zn, Zr, Mo, V, Co, Al, Sn, $NH_4$, $(CH_3)_4N$, and mixtures thereof. Suitable organic bases include, but are not necessarily limited to, diethanolamine, triethanolamine, choline bases and mixtures thereof. In one non-restrictive embodiment herein, the amount of saponified fatty acid that is effective as a viscosity breaker ranges from about 50 to about 20,000 ppm based on the total viscoelastic surfactant gelled fluid.

The use of the disclosed breaker systems is ideal for controlling viscosity reduction of VES based fracturing treating fluids. The breaking system may also be used for breaking gravel pack fluids, acidizing or near-wellbore clean-up fluids, and loss circulation pill fluids composed of VES. The breaker system may additionally work for foamed fluid applications (hydraulic fracturing, acidizing, and the like), where $N_2$ or $CO_2$ gas is used for the gas phase. The VES breaking methods herein are a significant improvement in that they give breaking rates for VES based fluids that the industry is accustomed to with conventional polymer based fluids, such as borate crosslinked guar and linear HEC (hydroxyethylcellulose). Potentially more importantly, the use of these internal breaker systems in combination with external downhole breaking conditions should help assure and improve hydrocarbon production compared to prior art that uses only external mechanisms to break the VES fluid for effective and complete VES fluid clean-up after a treatment.

In one non-limiting embodiment of the invention, the compositions herein will degrade the gel created by a VES in an aqueous fluid, by disaggregation or rearrangement of the VES micellar structure. However, the inventors do necessarily not want to be limited to any particular mechanism. Also, in another non-restrictive version, the only component present in the VES gelled aqueous fluid that reduces viscosity is one of the internal breakers described herein, or mixtures thereof. That is, a separately introduced external breaker component introduced after the VES-gelled fracturing fluid is not used (e.g. various clean-up fluids). However, conditions (such as elevated temperature) and already existing chemicals (reservoir hydrocarbons) may be present when and where the internal breakers are included, either intentionally or incidentally.

The viscoelastic surfactant gelled fluids herein can optionally contain at least one viscosity enhancer. The viscosity enhancers herein also aid with fluid loss control. Suitable viscosity enhancers include, but are not limited to, pyroelectric particles, piezoelectric particles, and mixtures thereof. Details about the use of pyroelectric and piezoelectric particles may be found in U.S. Pat. No. 7,544,643, incorporated by reference herein in its entirety. Consequently, the viscosity enhancers may have a particle size ranging between about 1 nanometer up to about 2 microns. In one non-limiting theory or explanation, when the fluid containing the viscosity enhancers is heated and/or placed under pressure, the particles develop surface charges that associate, link, connect, or relate the VES micelles to one another thereby increasing the viscosity of the fluid. This is somewhat analogous to the way crosslinkers connect various polymer chains, but the way the viscosity enhancers associate the elongated or "worm-like" VES micelles is believed to be completely different.

Suitable viscosity enhancers include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. An effective amount of the viscosity enhancer ranges from about 0.1 to about 500 pptg (about 0.012 to about 60 kg/m$^3$) based on the total aqueous viscoelastic treating fluid.

Additionally, the viscoelastic surfactant fluid of this invention may optionally also contain high temperature viscosity stabilizers. The viscosity stabilizers used herein would be in most cases for stabilizing or sustaining the VES fluid viscosity at elevated fluid temperatures, such as above 180° F. (82° C.), as contrasted with increasing the fluid viscosity like viscosity enhancers may do. Suitable viscosity stabilizers include, but are not limited to, magnesium oxide, magnesium hydroxide, calcium oxide, calcium hydroxide, sodium hydroxide, and the like. The select viscosity stabilizers may, in one non-limiting embodiment, have an average particle size of 500 nanometers or less, that is, to be preferably small enough to be non-pore plugging and thereby will remain with the VES fracturing fluid wherever it goes during the fracturing treatment and during flowback. More information about using these oxides and hydroxides as high temperature viscosity stabilizers may be found in U.S. Pat. No. 7,343,972 and U.S. Patent Application Publication No. 2008/0051302, both of which are incorporated by reference herein in their entirety.

The increased viscosity of aqueous fluids gelled with viscoelastic surfactants (VESs) may also be maintained or stabilized by one or more stabilizers that are glycols and/or polyols. These glycols and polyols may stabilize the increased viscosity of VES-gelled fluids effectively over an increased temperature range, such as from about ambient to about 300° F. (about 149° C.). Even though some VESs used to increase the viscosity of aqueous fluids contain a glycol solvent, the use, addition or introduction of the same or different glycol or a polyol, possibly of increased purity, may improve the viscosity stability of the fluid as a whole. Suitable glycols for use with the stabilizing method herein include, but are not necessarily limited to, monoethylene glycol (MEG), diethylene glycol (DEG), triethylene glycol (TEG), tetraethylene glycol (TetraEG), monopropylene glycol (MPG), dipropylene glycol (DPG), and tripropylene glycol (TPG), and where the polyols include, but are not necessarily limited to, polyethylene glycol (PEG), polypropylene glycol (PPG), and glycerol and other sugar alcohols, and mixtures thereof. In the case where the stabilizer is a polyol, the molecular weight of the polyol may range from about 54 to about 370 weight average molecular weight, alternatively where the lower threshold is about 92 weight average molecular weight, and/or where the upper threshold is about 235 weight average molecular weight. Suitable proportions of glycols or polyol stabilizers that may be used, introduced or added, in one non-limiting embodiment range from about 0.1 to 10.0% by volume based on the total of the aqueous fluid. In an alternate, non-restrictive embodiment, the lower end of this proportion range may be about 0.2% by, and additionally or alternatively the upper end of this proportion range may be about 5.0% by. Further details about polyol and/or glycol stabilizers may be found in U.S. Patent Application Publication No. 2007/0244015, incorporated herein in its entirety by reference.

Any suitable mixing apparatus may be used to formulate the viscoelastic surfactant gelled fluid. In the case of batch mixing, the VES gelling agent, the viscosity enhancer and the aqueous fluid are blended for a period of time. There are select internal breakers (e.g. transitional metal ion source, vegetable, and/or animal oil, etc.) that may be added during batch mixing or on the fly during the treatment. Alternately, other internal breakers are added after batch mixing or on the fly during the treatment (e.g. mineral oil, hydrogenated polyalphaolefin oils, etc.). The VES that is useful herein may be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference in their entirety.

Viscoelastic surfactants improve the treating fluid performance through the use of a polymer-free system. These systems, compared to polymeric based fluids, can offer improved viscosity breaking, higher sand transport capability (where appropriate), are in many cases more easily recovered after treatment than polymers (particularly with the internal breakers discussed), and are relatively non-damaging to the reservoir with appropriate contact with internal breakers and/or sufficient quantity of reservoir hydrocarbons, such as crude oil and condensate. The systems are also more easily mixed "on the fly" in field operations and do not require numerous co-additives in the fluid system, as do some prior systems.

The viscoelastic surfactants suitable for use herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amidoamine oxide gelling agent is Akzo Nobel's AROMOX® APA-T formulation, which should be understood as a dipropylamine oxide since both R' groups are propyl.

Materials sold under U.S. Pat. No. 5,964,295 include CLEAR-FRAC™, which may also comprise greater than 10% of a glycol. One preferred VES is an amine oxide. As noted, a particularly preferred amine oxide is APA-T, sold by Baker Oil Tools as SURFRAQ™ VES. SURFRAQ is a VES liquid product that is 50% APA-T and greater than 40% propylene glycol. These viscoelastic surfactants are capable of gelling aqueous solutions to form a gelled base fluid. The additives of this invention are used to prepare a VES system sold by Baker Oil Tools as DIAMONDFRAQ™. DIAMONDFRAQ™ with its assured breaking technology overcomes reliance on external reservoir conditions in order to break, as compared with products such as CLEARFRAC™.

The methods and compositions herein also cover commonly known materials as AROMOX® APA-T manufactured by Akzo Nobel and other known viscoelastic surfactant gelling agents common to stimulation treatment of subterranean formations.

The amount of VES included in the fracturing fluid depends on at least two factors. One involves generating enough viscosity to control the rate of fluid leak off into the pores of the reservoir or fracture, and the second involves creating a viscosity high enough to fracture the formation during the hydraulic pumping, in the non-limiting case of a treating fluid. Thus, depending on the application, the VES is added to the aqueous fluid in concentrations ranging from about 0.5 to 25% by volume, alternatively up to about 12 vol % of the total aqueous fluid (from about 5 to 120 gptg). In another non-limiting embodiment, the range for the present formulations is from about 1.0 to about 6.0% by volume VES product. In an alternate, non-restrictive form of the invention, the amount of VES ranges from a lower limit of about 2 independently to an upper limit of about 10 volume %.

In one non-limiting embodiment, the VES-based fracturing fluid may be used as a foamed fracturing fluid, that is, since the fluid contains a significant amount of a foamable surfactant, such as amine oxide surfactants in one non-restrictive case, the fracturing fluid may be energized by gases (i.e. may contain a gas phase for better or more distribution), such as $CO_2$ and $N_2$ and the like during the fracturing treatment.

It is expected that the breaking compositions herein may be used to reduce the viscosity of a VES-gelled aqueous fluid regardless of how the VES-gelled fluid is ultimately utilized. For instance, the viscosity breaking compositions could be used in all VES applications including, but not limited to, VES-gelled friction reducers, VES viscosifiers for loss circulation pills, fracturing fluids (including foamed fracturing fluids and acid fracturing fluids), gravel pack fluids, VES viscosifiers used to clean up drilling mud filter cake, remedial clean-up of fluids after a VES treatment (post-VES treatment) in regular or foamed fluid forms (i.e. the fluids may be "energized") with the gas phase of foam being $N_2$ or $CO_2$, and the like.

Figure 6:
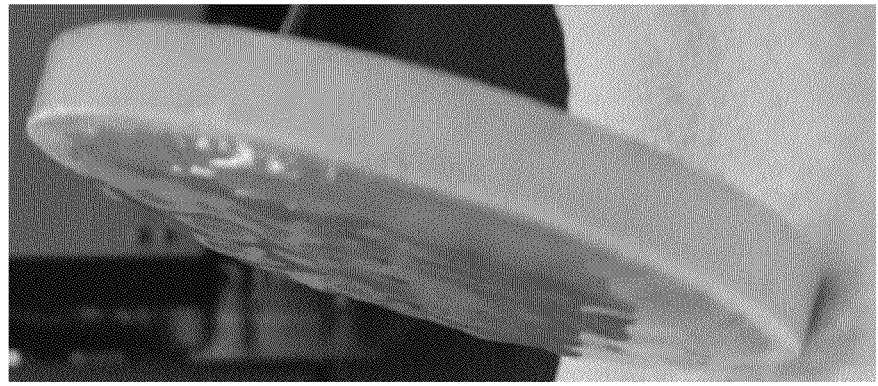
FIG. 6 is a photo of pseudo-filter cake on a 400 and Aloxite disc; the pseudo-filter cake is composed of VES micelles, internal breaker, and nanoparticle (nano MgO) fluid loss control agent.

The viscoelastic surfactant gelled fluids herein may also contain fluid loss control agents, although as noted above, some of the components such as the viscosity enhancers already discussed function as fluid loss control agents at higher concentrations, such as 15 pptg (1.5 kg/m³). An example of a novel pseudo-filter cake is shown in FIG. 6, which is composed of VES micelles, fish oil 18:12 TG internal breaker, and FLC-41 nanoparticle fluid loss control agent—a very unique and synergistic combination of additives with phenomenal performance and clean-up properties. Suitable fluid loss agents would include, but not necessarily be limited to alkaline earth metal oxides, alkaline earth metal hydroxides, transition metal oxides, transition metal hydroxides, and mixtures thereof, such as MgO, ZnO and the like.

More information on these fluid loss control agents may be found in U.S. Pat. No. 7,550,413 incorporated by reference herein in its entirety. Improving or increasing fluid loss may also be accomplished by increasing the concentration or use of the nano-sized particles that enhance viscosity. Increasing the concentration of these particles will eventually be enough to allow the build up of higher fluid viscosity for: 1) reservoir matrix viscosity improvement; and for 2) development of mostly an "external viscous VES fluid layer" on the formation, that is, a pseudo-filter cake (in contrast to a true filter cake that often extends into the formation with potential for damaging the formation). The combination of both can occur, that is, an internal/matrix of the pore-type viscosity fluid loss control and external pseudo-filter cake development. In one non-limiting embodiment, the amount of fluid loss control agent ranges from about 2 to about 200 pptg (about 0.2 to about 24 kg/m$^3$) based on the VES gelled fluid. It may be realized that certain materials, e.g. alkali metals and alkaline earth metals, may serve and function as both "high temperature viscosity stabilizers" and as fluid loss agents within the fluids of the invention herein.

It is expected in one non-limiting embodiment that the fluid loss control agents would be primarily the nano-sized particles discussed above for fluid loss control and viscosity enhancing. Increasing the amount of these agents increases the building of pseudo-filter cake. These particles include, but are not necessarily limited to the piezo- and pyroelectric particles, optionally in nano-sized form. Coarser or larger-sized transition metal oxide and/or transition metal hydroxides such as MgO may also be used alone or together with the nano-sized particles discussed immediately above. The fluid loss control agents may be added at any time during the mixing and/or blending process.

A value of the compositions and methods herein is that a VES-based fracturing fluid may be designed to have enhanced breaking characteristics. That is, fluid breaking is no longer solely dependant on external reservoir conditions for viscosity break and is controllable: the rate of viscosity reduction, if complete break is achieved or approached, occurs throughout the reservoir interval, and the amount of reservoir pressure required to displace the VES-based fluid is significantly reduced. Importantly, better clean-up of the VES fluid from the formation and wellbore can be achieved thereby. Better clean-up of the VES directly influences the success of the frac treatment, which is an enhancement of the well's hydrocarbon productivity. VES fluid clean-up limitations and failures of the past can now be overcome or improved by the use of fluid compositions disclosed herein.

In order to practice the method of the invention, an aqueous treating fluid, as a non-limiting example, is first prepared by blending a viscosity enhancer, a VES gelling agent, and an internal breaker into an aqueous fluid. The aqueous fluid could be, for example, water, brine, seawater, or mixtures thereof. Any suitable mixing apparatus may be used for this procedure. In one non-limiting embodiment, in the case of batch mixing, the viscosity enhancer, VES gelling agent, and the aqueous fluid are blended for a short period of time sufficient to mix the components together, such as for 15 minutes to 1 hour, and the internal breaker may be added just prior to use. In another non-limiting embodiment all of the viscosity enhancer, VES gelling agent and the internal breaking composition may be added to the aqueous fluid on the fly, during a treatment.

The base fluid can also contain other conventional additives common to the well service industry such as water wetting surfactants, non-emulsifiers, scale inhibitors, and the like. As noted herein, the base fluid can also contain other non-conventional additives which can contribute to the breaking action of the VES fluid, and which are added for that purpose in one non-restrictive embodiment.

Any or all of the above internal breakers (e.g. mineral, vegetable, and animal oils) may be provided in an extended release form such as encapsulation by polymer or otherwise, pelletization with binder compounds, absorbed or some other method of layering on a microscopic particle or porous substrate, and/or a combination thereof. Specifically, the internal breakers (in non-restrictive embodiments mineral, plant and/or fish oils) may be micro- and/or macro-encapsulated to permit slow or timed release thereof. In non-limiting examples, the coating material may slowly dissolve or be removed by any conventional mechanism, or the coating could have very small holes or perforations therein for the mineral oils within to diffuse through slowly. For instance, a mixture of fish gelatin and gum acacia encapsulation coating available from ISP Hallcrest, specifically CAPTIVATES® liquid encapsulation technology, can be used to encapsulate the internal breakers herein (e.g. mineral, plant, fish, synthetic and other saturated oils). Also, polymer encapsulation coatings such as used in fertilizer technology available from Scotts Company, specifically POLY-S® product coating technology, or polymer encapsulation coating technology from Fritz Industries could possibly be adapted to the methods of this invention. The mineral oils could also be absorbed onto zeolites, such as Zeolite A, Zeolite 13X, Zeolite DB-2 (available from PQ Corporation, Valley Forge, Pa.) or Zeolites Na-SKS5, Na-SKS6, Na-SKS7, Na-SKS9, Na-SKS10, and Na-SKS13, (available from Hoechst Aktiengesellschaft, now an affiliate of Aventis S.A.), and other porous solid substrates such as MICROSPONGE™ (available from Advanced Polymer Systems, Redwood, Calif.) and cationic exchange materials such as bentonite clay or placed within microscopic particles such as carbon nanotubes or buckminster fullerenes. Further, the mineral oils may be both absorbed into and onto porous or other substrates and then encapsulated or coated, as described above.

In a typical fracturing operation, the fracturing fluid of the invention is pumped at a rate sufficient to initiate and propagate a fracture in the formation and to place propping agents into the fracture. A typical fracturing treatment would be conducted by mixing a 20.0 to 60.0 gallon/1000 gal water (60.0 liters/1000 liters) amine oxide VES, such as SurFRAQ, in a 2% (w/v) (166 lb/1000 gal, 19.9 kg/m$^3$) KCl solution at a pH ranging from about 6.0 to about 9.0. The breaking component may be added during the VES addition or more typically after the VES addition to the water or brine using appropriate mixing and metering equipment, or if needed in a separate step after the fracturing operation is complete, or combinations of these procedures.

In one embodiment herein, the methods and compositions herein are practiced in the absence of gel-forming polymers and/or gels or aqueous fluids having their viscosities enhanced by polymers. However, combination use of the compositions and methods herein with polymers and polymer breakers may also be of utility. For instance, polymers may also be added to the VES fluid herein for fluid loss control purposes. Types of polymers that may serve as fluid loss control agents include, but are not necessarily limited to, various starches, modified starches, polyvinyl acetates, polylactic acid, guar and other polysaccharides, hydroxyethylcellulose and other derivatized celluloses, gelatins, and the like. For more information about using polymers together with viscoelastic surfactants to reduce friction loss and fluid loss, please see U.S. Pat. No. 7,530,393 and U.S. Patent Application Publication No. 2008/0161209 A1, respectively, both of which are incorporated by reference herein in their entirety.

Propping agents are typically added to the base fluid after the addition of the VES in the preparation of a fracturing fluid. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120-1700 kg/m$^3$) of fracturing fluid composition, but higher or lower concentrations can be used as the fracture design required. The base fluid can also contain other conventional additives common to the well service industry such as water wetting surfactants, non-emulsifiers and the like. As noted herein, the base fluid can also contain other non-conventional additives which can contribute to the breaking action of the VES fluid, and which are added for that purpose in one non-restrictive embodiment.

Synergism and/or advantages that may be exhibited with the compositions and methods herein considered as a whole may be seen in one or more of the following attributes.

1. The use of the fluid loss agent may make any VES-gelled fluid more efficient and more able to generate proper fracture geometry, and permit less VES gelling agent to be used to achieve these goals.
2. The viscosity enhancer may permit the fluid loss control agent to work even better, make it an even more efficient VES fluid, and it may lower the rate of VES fluid loss during a fracturing operation even more.
3. The high temperature viscosity stabilizer helps further the efficiency of the fluid loss control agents and viscosity enhancers—an added or synergistic improvement built on fluid leak-off performance.
4. The use of internal breakers in VES-gelled fluids containing fluid loss and/or viscosity enhancers and/or high temperature viscosity stabilizers improves the cleanup of these fluids significantly, and allows their use or application without concern or a problem of the fluid being formation damaging (i.e. avoids damage to reservoir permeability and reservoir's productivity). Surprisingly, the internal breakers are compatible with and will allow the particulate fluid loss control agents, optional viscosity enhancers, and/or optional high temperature stabilizers to initially improve the VES fluid performance before dramatic viscosity reduction occurs.
5. The methods and compositions herein allow highly effective VES fluid use in gas wells, and in particular, provide effective leak-off control (i.e. less leak-off) in compressible fluid conditions, and allow gas to displace treatment fluid from a reservoir rapidly and completely after treatment, as the data in FIG. 10 appear to show. The inclusion of a stabilizer allows deep gas wells to be fractured by these VES fluid systems.
6. The methods and compositions described herein allow highly effective use within heterogeneous permeability reservoirs, where variance in reservoir permeability will not influence the placement of the specified amount of proppant as much, and in generating the specified geometry of fracture design—including reservoirs with highly contrasting permeability streaks or intervals across the formation zone.
7. The methods and compositions herein also allow their use in deep water offshore wells where high brine salinity is needed for lowering wellhead pressure at the surface while also controlling potential gas hydrates during production across the seafloor pipe interval, but where the fluid loss control additives, high temperature stabilizers and internal breakers must all be compatible and keep their high performance attributes in such heavy brine-high salinity mix waters.

More specifically, the use of fluid loss control agents may result in one or more of the following synergistic results and/or advantages being exhibited.

Figure 7:
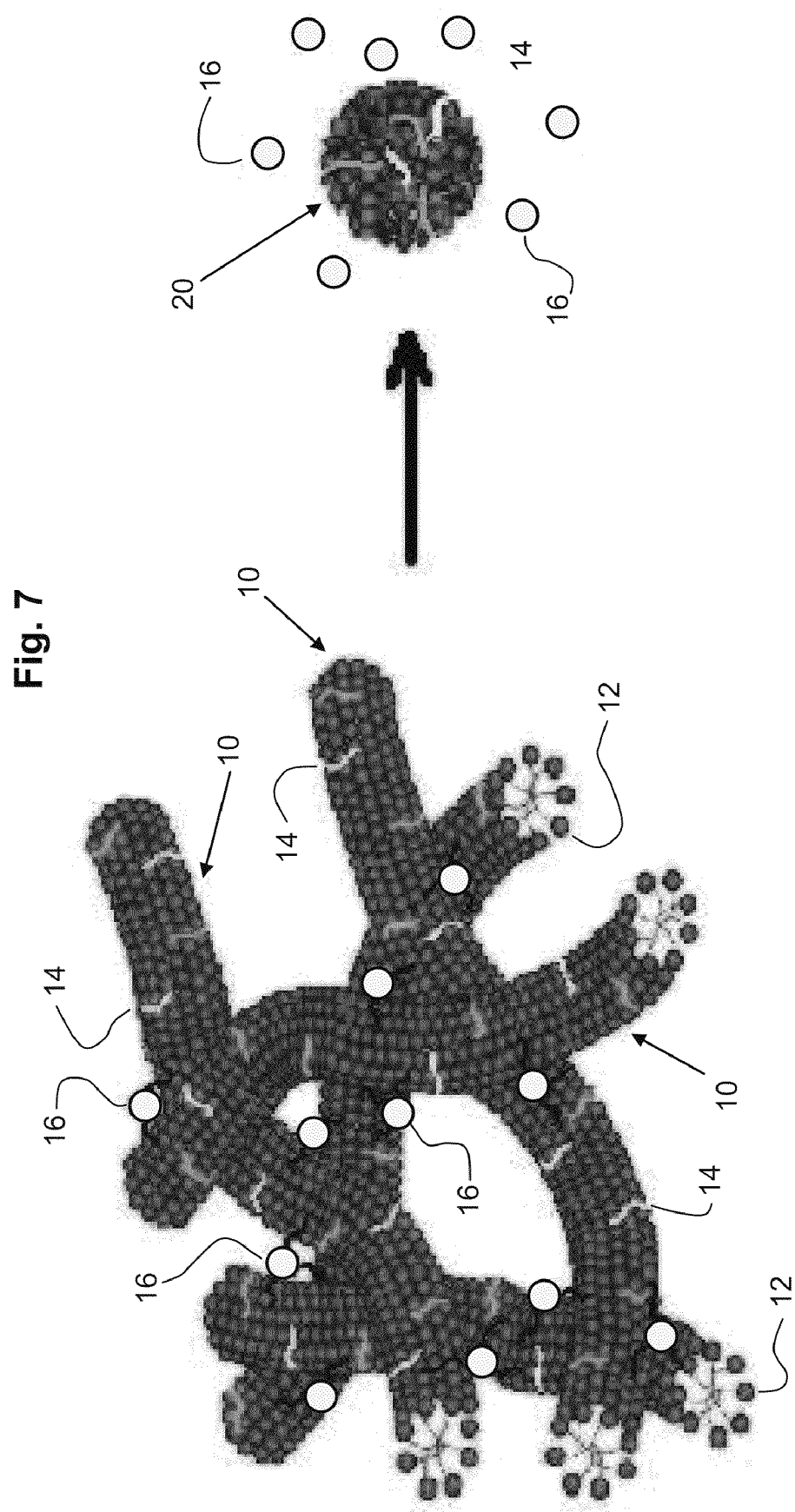
FIG. 7 is an illustration of the breaking of the VES gelled fluid by an internal breaker showing particles as fluid loss control agents and/or viscosity stabilizers or viscosity enhancers.

1. The use of fluid loss control agents gives the fluid the ability to form a pseudo-filter cake. This high viscosity VES fluid layer on the formation face lowers fracturing fluid leak-off rate. The pseudo-filter cake may use non-pore plugging nano-sized particles.
2. The fluid loss control agents allow the use of these fluids in significantly higher upper reservoir permeabilities. Without these fluid loss agents, upper reservoir permeability has been no more than about 800 md, and in most cases not more than about 400 md. However, with the novel fluid loss technology herein, VES-gelled fluids may be used in reservoirs of up to at least 2000 md permeability. Thus, the fluid loss control agents open up the domain of applications for these fluids and make the VES fluid much less sensitive to reservoir permeability for fracture generation and geometry.
3. The use of the fluid loss control agents avoids the use of polymers in the fluid loss control mechanism, and thus the present methods and compositions are much less damaging and much easier to clean up than polymer-type filter cake.
4. The use of select internal breakers that during mixing are incorporated within the VES micelles will work synergistically with fluid loss control agents that form pseudo-filter cake by allowing the necessary internal breaker to be present in the micelles, and over time at reservoir temperature will break apart the pseudo-filter cake fluid layer—a very unique synergism and phenomena. FIG. 7 schematically illustrates how an internal breaker 14 may be associated with VES micelles, and upon activation the internal breaker will collapse the rod-like or worm-like VES micelles 10 to spherical non-viscous micelles 20 and fluid loss control particles 16. The spherical micelles 20 do not have the enhanced viscosity provided by the entanglement and interaction of the rod-like or worm-like micelles 10. The micelles are formed from the plurality of VES molecules 12 having hydrophilic heads on the outer surface of the micelles where the hydrophobic tails are interior to the micelles. The internal breaker 14 is believed to be associated with the hydrophobic tails.
5. The fluid loss control agents here permit less VES leaked-off into the reservoir. This in turn means that less VES fluid is needed for treatment and lowers the total amount of VES fluid and internal breaker needed for treatment, and hence lowers the overall treatment cost. Following on, less VES fluid needs to be broken and removed from the reservoir, the fluid is more efficient at generating better fracture extension and width for best production, and better proppant suspension and placement is accomplished throughout fracture.
6. The fluid loss control agents herein are also fully compatible with the high temperature micelle stabilizers, the viscosity enhancers, the internal breakers and high mix water salinity, such as seen in 14.4 ppg (1.7 kg/l) CaBr$_2$ brine and seawater.

The use of the viscosity enhancers described herein also results in a number of advantages and synergistic benefits.

1. The use of these viscosity enhancers permits less VES gelling agent to be used in the fluid compositions to achieve the same fluid viscosity which lowers the overall cost for using the VES fluid. A lower VES loading also breaks easier and require less internal breaker, giving cost savings and a quicker and more thorough clean-up.
2. The viscosity enhancer works in combination with the fluid loss agent and will synergistically help the fluid efficiency by improving the viscosity dependant fluid leak-off control mechanism combined with the pseudo-filtercake controlled fluid leak-off mechanism. That is, the viscosity enhancers improve the viscosity dependant leak-off property of the VES fluid and works in combination with the particulate fluid loss control agents that generate a novel pseudo-filtercake viscous fluid layer, a second fluid loss control mechanism. The viscosity enhancer working together with the fluid loss agent is cost effective, that is, it is cheaper than using more VES gelling agent to achieve the same results, which results include generating an optimized fracture geometry, which is important for improving the reservoir hydrocarbon productivity.
3. In turn the viscosity enhancers herein are fully compatible with the fluid loss control agents, high temperature micelle stabilizers, internal breakers, and high mix water salinity, such as that found in 11.8 ppg (1.4 kg/liter) $CaCl_2$ and 14.4 ppg (1.7 kg/l) $CaBr_2$ brine, and including seawater.

The use of high temperature micelle-viscosity stabilizers also allows a number of advantages and synergistic results including, but not limited to the following.
1. The viscosity stabilizers permit the VES-gelled fluid to be used at higher temperatures than without the stabilizers.
2. Using viscosity stabilizers means less VES gelling product is needed to have job specified viscosity for BHST (bottomhole static temperature) reservoirs between about 200° F. and about 300° F. (about 93° C. and about 149° C.). As much as 55% less VES gelling agent can be used, which is a considerable savings on treatment cost. FIG. 1 shows how amazingly low amounts of VES can be used at elevated temperatures, which uniquely surpasses prior art VES fracturing fluid technology. There is less total VES gelling that needs to be cleaned up. The use of viscosity stabilizers also permits less internal breaker to break the stabilized VES fluid, and thus there is a savings on internal breaker cost.
3. In turn, the viscosity stabilizers are fully compatible with the fluid loss control agents, the viscosity enhancers, the internal breakers, and high mix water salinity, such as 11.8 ppg (1.4 kg/liter) $CaCl_2$ and 14.4 ppg (1.7 kg/l) $CaBr_2$ brine, including seawater.

Finally, the use of internal breakers provides a number of advantages and synergistic results including, but not necessarily limited to the following.
1. The use of internal breakers means the operators do not have to rely on reservoir hydrocarbons for the rate of clean up or completeness of clean up of the VES fluid. The use of internal breakers also helps prevent possible viscous and damaging emulsions forming from the mixing of problematic reservoir crude with surfactant-laden treatment fluid in the reservoir matrix during treatment fluid recovery from the well. An internally broken VES fluid is easily produced and does not need to contact crude oil in order to break, readily flow and be cleaned up, whereas typical VES fluid relying on reservoir hydrocarbons to break must interact with, mix with and contact the crude oil during treatment fluid recovery. Such commingling may produce a damaging emulsion in the reservoir.
2. Internal breakers are very important for using VES fluids in gas well reservoirs. Natural gas wells generally have problematic clean-up when VES-gelled fracturing fluids are used. Clean up using conventional VES systems may be very slow at best; in contrast to when an internal breaker is employed, it is very fast (about 48 hours total cleanup with breaker). Also using conventional VES systems, clean-up is typically incomplete—gas is a poor displacement fluid for VES fluids in porous media, and gas by-pass and channeling through the VES fluid typically occurs. With internal breakers, fast and complete VES fluid recovery occurs and gas has been found to easily displace the broken VES fluid from the porous media, as the data in FIG. 10 appear to show.
3. Further, the internal breakers are fully compatible with the fluid loss control agents, the viscosity enhancers, the high temperature viscosity stabilizers, and high mix water salinity, such as that in 11.8 ppg (1.4 kg/liter) $CaCl_2$ and 14.4 ppg (1.7 kg/l) $CaBr_2$ brines, including seawater. Additionally, the internal breakers may be used across a temperature range from about 80° F. to about 300° F. (about 27° C. to about 149° C.) for these advantages.

The present invention will be explained in further detail in the following non-limiting Examples that are only designed to additionally illustrate the invention but not narrow the scope thereof.

General Procedure for Example 1

To a blender was added tap water, salt, viscosity enhancer, followed by 4 vol %-viscoelastic surfactant (WG-3L—AROMOX® APA-T available from Akzo Nobel). The blender was used to mix the components on a very slow speed, to prevent foaming, for about 30 minutes to form a 4% by VES base fluid and internal breaker and VES stabilizer were then added and mixed into the VES fluid for an additional 5 minutes for preparing the laboratory fracturing fluid. Since a goal of the research was to find a relatively rapid gel breaking composition, samples were only observed for 5 hours or less, as indicated.

Example 1

Shown in FIG. 1 is a graph of the viscosity of a VES gelled fluid, 14.2 pptg (1.7 kg/m$^3$) $CaCl_2$/$CaBr_2$ brine with 2% and 4% by volume (bv) WG-3L VES at 275° F. (135° C.) and having 2.0 and 4.0 pptg (0.24 and 0.48 kg/m$^3$, respectively) VES-STA1 viscosity stabilizer, as a function of time. VES-STA1 viscosity stabilizer is available from Baker Oil Tools. Viscosity testing was performed on a Grace rheometer at 250° F. (121° C.) with 300 psi (2.1 MPa) pressure and 100 sec$^{-1}$ shear. It may be seen that the fluid without a viscosity stabilizer lost essentially all of its viscosity over the course of the first hour. In contrast, the two fluids containing the VES-STA1 viscosity stabilizer essentially maintained a constant viscosity over the 5-hour test period. The stability of 2% VES at 275° F. (135° C.) is quite remarkable, compared to prior art VES fluid systems, and the 4% VES loading at 275° F. (135° C.) represents how less VES product can be surprisingly used at high temperature that will save overall treatment system cost and less VES needed to be cleaned up after the treatment.

Example 2

Shown in FIG. 2 is a graph of the viscosities of VES gelled fluids over time that have no high temperature stabilizer, 6.0 pptg (0.72 kg/m³) VES-STA 1 high temperature stabilizer, 6.0 pptg (0.72 kg/m³) VES-STA 1 high temperature stabilizer with 2.0 gptg Fish Oil 18:12 TG (from Bioriginal Food & Science Corporation) internal breaker, and 10.0 gptg FLC-40L fluid loss control agent with 2.0 gptg Fish Oil 18:12 TG internal breaker, mixed in 13.0 pptg (1.6 kg/m³) $CaCl_2/CaBr_2$ brine with 4% by volume (bv) WG-3L VES at 250° F. (121° C.). The VES-STA1 and FLC-40L are available from Baker Oil Tools. Viscosity testing was performed on a Grace rheometer at 250° F. (121° C.) with 300 psi (2.1 MPa) pressure and 100 sec⁻¹ shear. The data shows VES-STA 1 allows a very low VES loading to be used for fracturing at 250° F. (121° C.), and with an internal breaker present, the viscosity can be controllably reduced for faster and more complete VES fluid clean-up. The test with 10.0 gptg FLC-40L showed the fluid loss control agent also performed as a high temperature stabilizer and was surprisingly compatible with the polyenoic internal breaker, even at high test temperature and mix water salinity, with high loading of FLC-40L. This type of formulation would be beneficial for use in deepwater frac-pack applications.

Example 3

Figure 3:
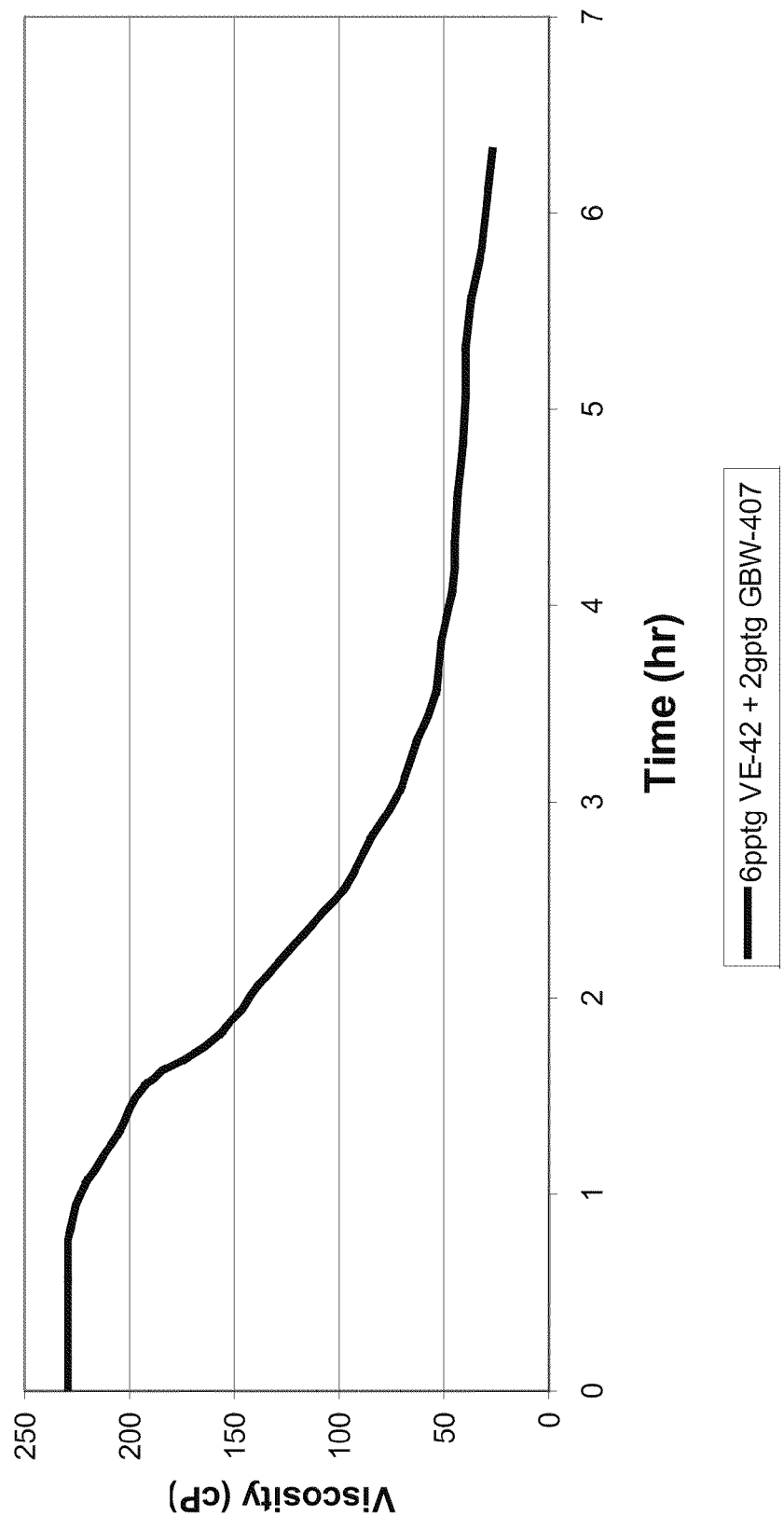
FIG. 3 is a graph of the viscosity of VES gelled fluids in 13.0 ppg (1.6 kg/liter) $CaCl_2/CaBr_2$ brine with 4% by volume (bv) WG-3L VES at 250° F. (121° C.) and having 6.0 pptg (0.72 kg/m$^3$) VE-42 (VE-42 is a nano-sized ZnO) viscosity enhancer or stabilizer with 2.0 gptg Fish Oil 18:12 TG as internal breaker, as a function of time.

Shown in FIG. 3 is a graph of the viscosity of a VES gelled fluid over time that has 6.0 pptg (0.72 kg/m³) VE-42 (nano-sized ZnO) viscosity enhancer or temperature stabilizer with 2.0 gptg Fish Oil 18:12 TG internal breaker mixed in 13.0 pptg (1.6 kg/m³) $CaCl_2/CaBr_2$ brine with 4% by volume (bv) WG-3L VES at 250° F. (121° C.) and shear rate 100 1/s. It may be seen that the internal breaker starts to be active in one hour, and the fluid viscosity reduces slowly.

Example 4

Shown in FIG. 4 is a graph of the viscosities of VES gelled fluids over time that have 6.0 pptg (0.72 kg/m³) nano-sized MgO for a high temperature stabilizer and 20.0 pptg (2.40 kg/m³) nano-sized MgO for a high temperature stabilizer and fluid loss control agent, mixed in 13.0 pptg (1.6 kg/m³) $CaCl_2/CaBr_2$ brine with 4% by volume (bv) WG-3L VES and 1.5 gptg Fish Oil 18:12 TG internal breaker at 250° F. (121° C.) and shear rate 100 1/s. It may be seen that the internal breaker may significantly reduce the viscosity for both fluids. Also, breaking time depends on the loading of internal breaker not on the loading of the nano-sized MgO.

Example 5

Figure 5:
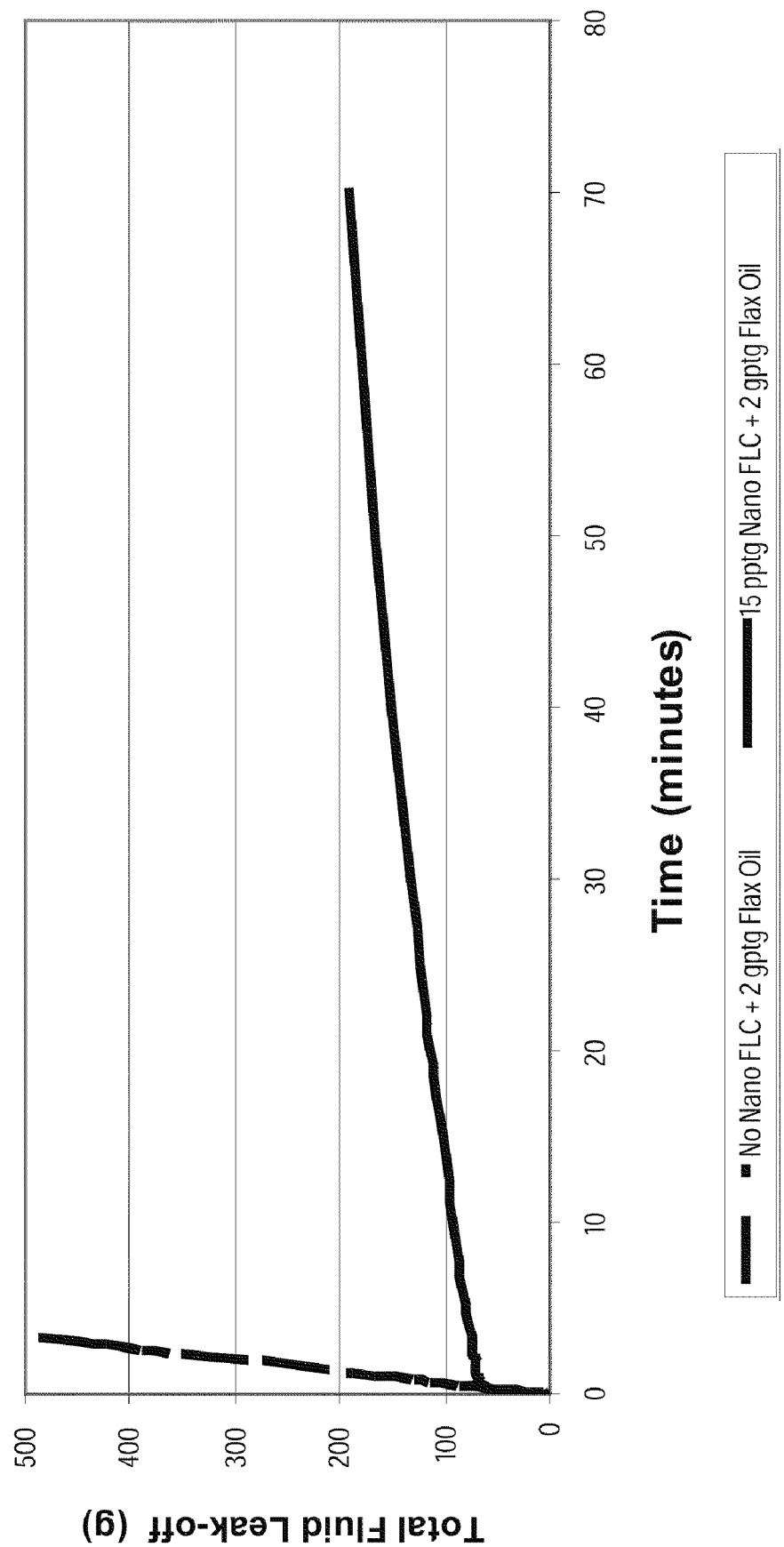
FIG. 5 is a graph of the fluid leak-off of VES gelled fluids in 3% bw KCl brine with 4% by volume (bv) WG-3L VES through 400 and Aloxite disc at 150° F. (66° C.) and 300 psi (2.1 MPa) having no FLC-41 as fluid loss control agent with only 2.0 gptg Conventional Flax Oil as internal breaker ("conventional" herein means a particular known kind of flax oil, not that it is known to be used conventionally as a breaker), and the other having 15 pptg (pounds per thousand gallons) FLC-41 (nano-sized MgO) as a fluid loss control agent with 2.0 gptg Conventional Flax Oil internal breaker, as a function of time.

Shown in FIG. 5 is a graph of the fluid loss of VES gelled fluids over time that have 3% by weight (bw) KCl brine mixed 4% by volume (bv) WG-3L VES and 2 gptg Conventional Flax Oil (from Bioriginal Food & Science Corporation) as an internal breaker with and without 15.0 pptg (1.8 kg/m³) nano-sized MgO for fluid loss control agent at 150° F. (66° C.) and 300 psi (2.1 MPa) pressure. With 15.0 pptg (1.8 kg/m³) fluid loss control agent, it may be seen that the fluid loss may be dramatically reduced.

Example 6

Shown in FIG. 6 is a picture of a pseudo-filter cake on 400-md ceramic disc at 250° F. (121° C.) and 300 psi (2.1 MPa) pressure. The fluid is 13.0 pptg (1.6 kg/m³) $CaCl_2/CaBr_2$ brine mixed 4% by volume (bv) WG-3L VES and 1.0 gptg Fish Oil 18:12 TG internal breaker with 6.0 pptg (0.72 kg/m³) VES-STA 1 stabilizer and 10.0 pptg (1.2 kg/m³) nano-sized MgO FLC-41 fluid loss control agent. FIG. 7 is a schematic illustration of internally breaking the novel pseudo-filter cake composed of VES micelles, internal breaker and nano-particle fluid loss control agent.

Example 7

FIG. 8 is a graph of the viscosity of 9% KCl brine with 4% WG-3L and 5.0 gptg FCL-40L. Without breaker, the fluid was stable the 134° F. (57° C.) test temperature. The break test with mineral oil was 6.0 gptg HYDROBRITE® 200 and no VES breaking was observed over the 16 hour test period. The polyenoic break test was 6.0 gptg GBW-407L with 0.3 gptg GBC-4L, both from Baker Oil Tools, and the results show slow VES breaking. GBC-4L is a solution of cupric chloride. Surprisingly, faster and synergistic breaking was observed when 6.0 gptg HYDROBRITE® 200 was combined with 6.0 gptg GBW-407L and 0.3 gptg GBC-4L. Viscosity testing was performed on a Brookfield rheometer at 134° F. (57° C.) with 300 psi (2.1 MPa) pressure and 100 sec⁻¹ shear.

Example 8

FIG. 9 is leak-off control data at 134° F. (57° C.) and 1000 psi (7.0 MPa) using the synergistic dual breaker fluid formulation tested in Example 8: 9% KCl brine with 4% WG-3L, 5.0 gptg FCL-40L, 6.0 gptg HYDROBRITE® 200, 6.0 gptg GBW-407L and 0.3 gptg GBC-4L. The data show that 5.0 gptg FLC-40L gives efficient leak-off control, even in the presence of very high concentrations of internal breakers. All components of the fluid system showed they worked as a synergistic composition to improve VES fluid performance.

Example 9

Figure 10:
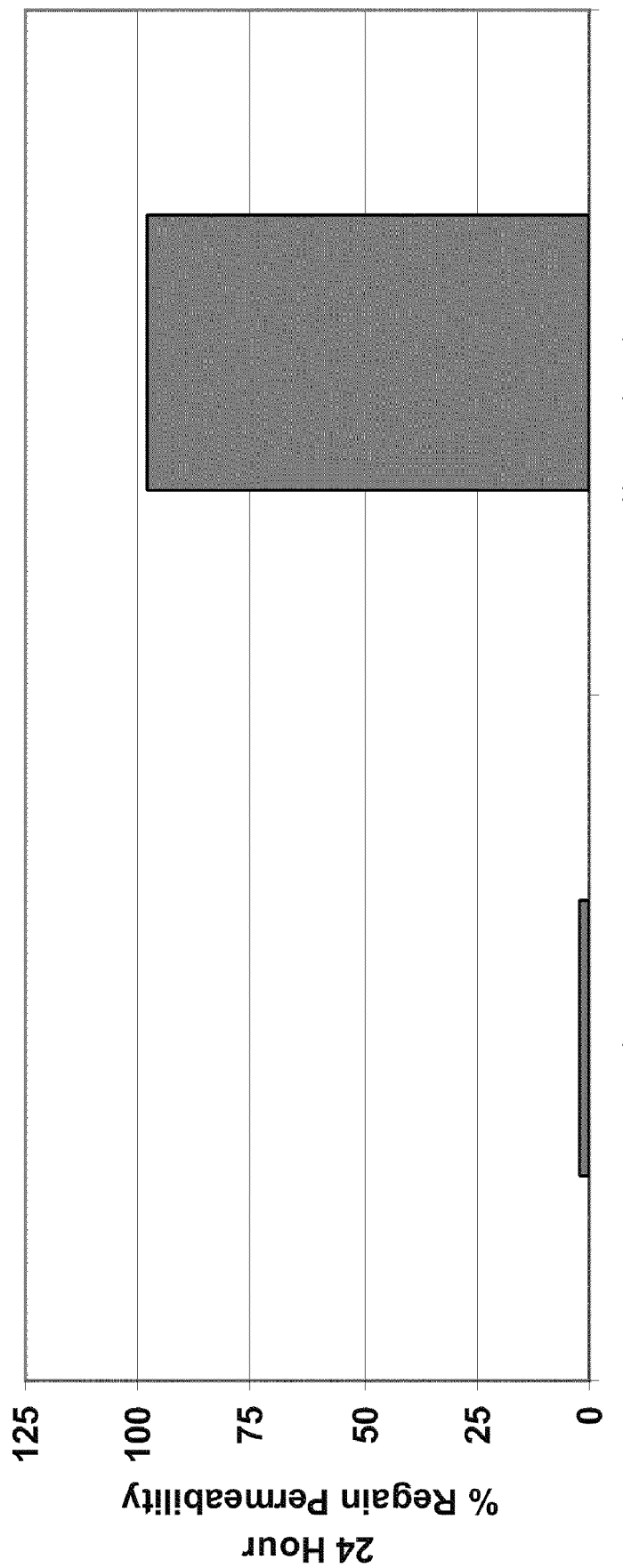
FIG. 10 is a graph of Berea core clean-up to $N_2$ gas of VES gelled fluids in 3% bw KCl brine with 4% by volume (bv) WG-3L VES at 150° F. (66° C.) having no internal breaker and with 3.0 gptg Fish Oil 18:12 TG internal breaker, as a function of time.

FIG. 10 is 100 and Berea core clean-up to $N_2$ gas data at 150° F. (67° C.) with 3% KCl brine and 4% WG-3L, with and without 3.0 gptg Fish Oil 18:12 TG. The data shows that $N_2$ gas is not an efficient displacement fluid when VES is unbroken (left bar graph), but internally broken VES is readily and easily producible to $N_2$ gas (right bar graph).

Example 10

Figure 11:
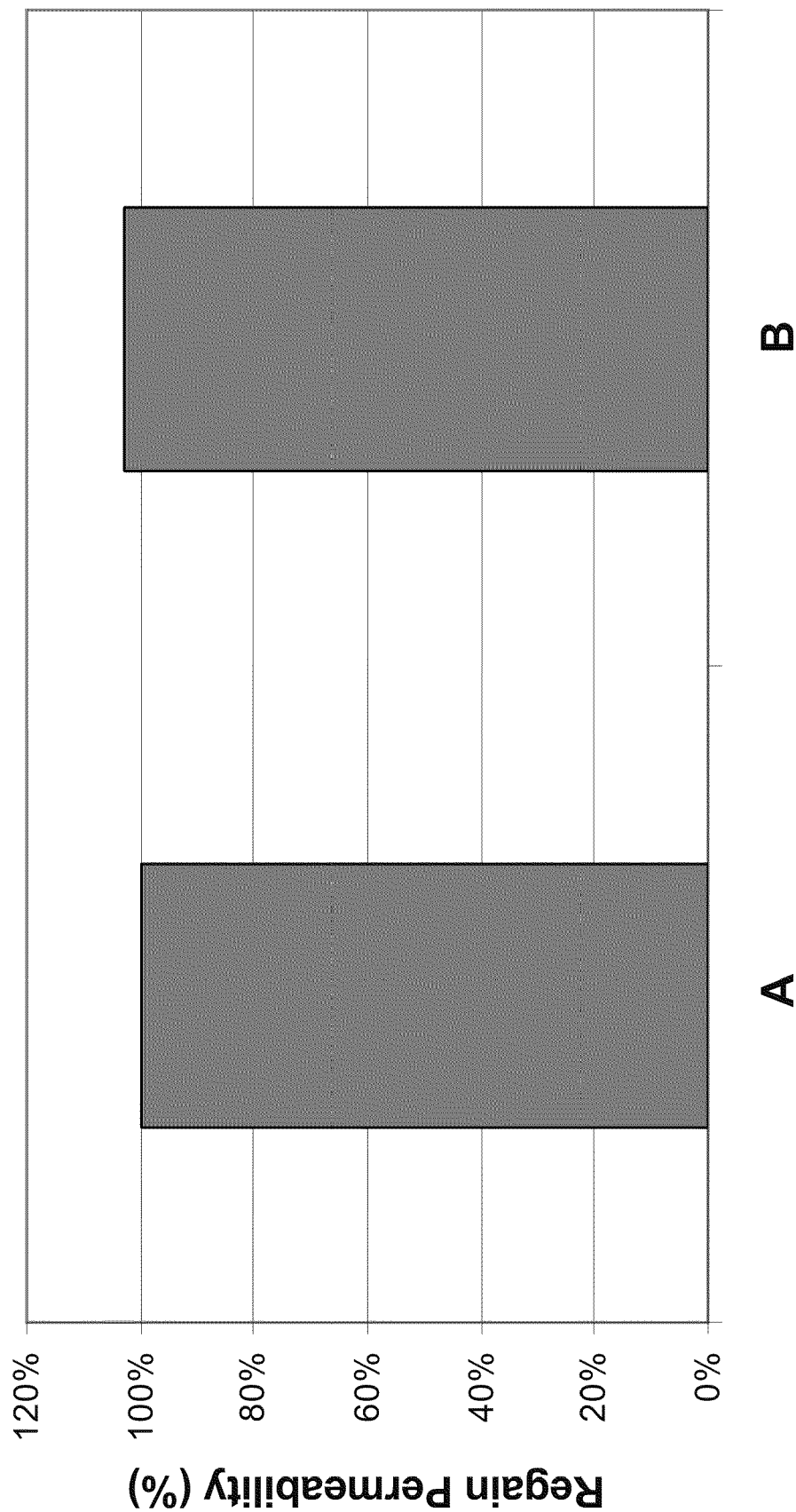
FIG. 11 is a graph of Berea core clean-up to $N_2$ gas and 3% KCl brine in 50 md and 500 md respectively of VES gelled fluids in 13.0 ppg (1.6 kg/liter) $CaCl_2$/$CaBr_2$ brine with 4% by volume (bv) WG-3L VES at 250° F. (121° C.) having 6.0 pptg (0.72 kg/m$^3$) FLC-41 (nano-sized MgO) with 1.5 gptg Fish Oil 18:12 TG.

FIG. 11 presents Berea core flow test results with $N_2$ gas and 3% KCl brine as displacement fluids at 250° F. (121° C.). Berea cores were cut into 1-inch diameter (2.54 cm) and 6-inch long (15.2 cm), vacuumed and dried. And the cores were saturated with filtered 3% bw KCl under vacuum. Then the core was loaded in a computer aid core flow tester and heated up to 250° F. (121° C.). The brine displacement test used 500-md range Berea core. The base permeability of the cores was measured in the producing direction with the 3% bw KCl. VES fluid with nanoparticles was then pumped through the cores in the injection direction for two pore volume and then left shut-in for 16 hours to allow the internal breakers to break down the viscosity of the VES fluids. The VES fluid is 13.0 pptg (1.6 kg/m³) $CaCl_2/CaBr_2$ brine mixed 4% by volume (bv) WG-3L VES and 1.5 gptg Fish Oil 18:12 TG internal breaker with 6.0 pptg (0.72 kg/m³) nano MgO. Then 3% bw KCl was pumped in the production direction to measure the final permeability of the core. The regain permeability is the ratio of final permeability to base permeability. For the gas displacement test, 50-md Berea core was used and a similar test schedule as brine was applied. The core was initially soaked in 3% bw KCl brine. The permeability of the core to $N_2$ gas was then performed as the baseline core permeability. Next the core was loaded with VES fluid. After shut-in, the VES fluid was displaced using $N_2$ gas over a 48-hr period and final permeability was measured. The tests show that after the internal breaker breaks the VES micelles the nanoparticles can easily flow with broken VES fluid in and out of Berea cores and no plugging was generated.

As may be seen, the method of gel breaking described herein is simple, effective, safe, and highly cost-effective. A method is provided for breaking the viscosity of aqueous fracturing fluids gelled with viscoelastic surfactants (VESs). Compositions and methods are also furnished herein for breaking VES-surfactant fluids controllably, completely and relatively quickly.

Compositions and methods are also disclosed herein for breaking VES-surfactant fluids where contact with reservoir fluids (an external breaking mechanism) is not required, although in some embodiments heat from the reservoir may help the breaking process. In some non-limiting embodiments, incidental contact with reservoir fluids may assist in reducing the viscosity of the fluids gelled in with the VES. Compositions and methods are additionally provided for breaking VES-surfactant fluids where the breaking additive is in a phase internal to the VES-surfactant fluid. Further, methods and VES fluid compositions are described herein for breaking the viscosity of aqueous fluids gelled with viscoelastic surfactants using readily available materials at relatively inexpensive concentrations.

As used herein, the word "comprising" as used throughout the claims is to be interpreted to mean "including but not limited to".

In the foregoing specification, the invention has been described with reference to specific embodiments thereof, and has been demonstrated as effective in providing methods and compositions for using VES-gelled aqueous fluids to fracture subterranean formations where the fluid has an internal breaker mechanism. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of viscoelastic surfactants, internal breakers, viscosity enhancers, fluid loss control agents, viscosity stabilizers, and other components falling within the claimed parameters, but not specifically identified or tried in a particular composition or fluid, are anticipated to be within the scope of this invention. Further, the aqueous VES-gelled fluids containing internal breakers and viscosity enhancers, fluid loss control agents, and high temperature stabilizers herein may be used in VES acid fracturing fluid treatments.

What is claimed is:

1. A viscoelastic surfactant (VES) gelled subterranean formation treatment fluid comprising:
    water;
    at least one VES in an amount effective to increase the viscosity of the water;
    at least one internal breaker selected from the group consisting of bacteria, saponified fatty acids, mineral oils, hydrogenated polyalphaolefin oils, saturated fatty acids, unsaturated fatty acids, and combinations thereof;
    at least one fluid loss control agent; and
    at least one viscosity enhancer is selected from the group consisting of pyroelectric particles, piezoelectric particles, and mixtures thereof, where the viscosity enhancer has a particle size ranging between about 1 nanometer up to about 2 microns, and where the viscosity enhancer is present in an amount of from about 0.1 to about 500 pptg (about 0.012 to about 60 kg/m$^3$).

2. The VES gelled subterranean formation treatment fluid of claim 1 where the saponified fatty acids are soap reaction products of a fatty acid with an alkaline compound selected from the group consisting of organic bases, alkali metal bases, alkaline earth metal bases, ammonium bases, and combinations thereof.

3. The VES gelled subterranean formation treatment fluid of claim 1 where the unsaturated fatty acids are selected from the group consisting of monoenoic acids, polyenoic acids, and mixtures thereof.

4. The VES gelled subterranean formation treatment fluid of claim 1 where:
    when the internal breaker is bacteria, the amount of bacteria ranges from about 0.01 to about 20.0 vol %;
    when the internal breaker is a saponified fatty acid, the amount of saponified fatty acid ranges from about 50 to about 20,000 ppm; and
    when the internal breaker is selected from the group consisting of mineral oils, hydrogenated polyalphaolefin oils, saturated fatty acids, unsaturated fatty acids and combinations thereof, the amount of internal breaker ranges from about 0.1 to about 20 gptg;
    all based on the VES gelled fluid.

5. The VES gelled subterranean formation treatment fluid of claim 1 where the internal breaker is a mineral oil and is at least about 99 wt % paraffin.

6. The VES gelled subterranean formation treatment fluid of claim 1 further comprising at least one VES stabilizer.

7. The VES gelled subterranean formation treatment fluid of claim 6 where the VES stabilizer is selected from the group consisting of alkali metal oxides, alkali metal hydroxides, alkaline earth metal oxides, alkaline earth metal hydroxides, transition metal oxides, transition metal hydroxides, glycols, polyols, and combinations thereof.

8. The VES gelled subterranean formation treatment fluid of claim 1 where the at least one fluid loss control agent is selected from the group consisting of alkaline earth metal oxides, alkaline earth metal hydroxides, transition metal oxides, transition metal hydroxides, and mixtures thereof.

9. The VES gelled subterranean formation treatment fluid of claim 1 where the amount of the fluid loss control agent ranges from about 2 to about 200 pptg (about 0.2 to about 24 kg/m$^3$) based on the VES gelled fluid.

10. The VES gelled subterranean formation treatment fluid of claim 1 where in the VES gelled fluid:
    the at least one VES is present in an amount of from about 0.5 to 12.0 vol % based on the VES gelled fluid.

11. The viscoelastic surfactant gelled subterranean formation treatment fluid of claim 1 where only one component is present in the treatment fluid that reduces viscosity, which is the at least one internal breaker.

12. The VES gelled subterranean formation treatment fluid of claim 1 where the internal breaker is present in an oil-soluble internal phase of the water of the VES gelled fluid.

13. A viscoelastic surfactant (VES) gelled subterranean formation treatment fluid comprising:
    water;
    at least one VES in an amount effective to increase the viscosity of the water;
    at least one internal breaker selected from the group consisting of bacteria, saponified fatty acids, mineral oils, hydrogenated polyalphaolefin oils, saturated fatty acids, unsaturated fatty acids and combinations thereof; and
    from about 2 to about 200 pptg (about 0.2 to about 24 kg/m$^3$) based on the VES gelled fluid, of at least one fluid loss control agent selected from the group consisting of alkaline earth metal oxides, alkaline earth metal hydroxides, transition metal oxides, transition metal hydroxides, and mixtures thereof; and at least one viscosity enhancer selected from the group consisting of pyroelectric particles, piezoelectric particles, and mixtures thereof, where the viscosity enhancer has a particle size ranging between about 1 nanometer up to about 2 microns, and where the viscosity enhancer is present in an amount of from about 0.1 to about 500 pptg (about 0.012 to about 60 kg/m$^3$).

14. The VES subterranean formation treatment fluid of claim 13 where the saponified fatty acids are soap reaction products of a fatty acid with an alkaline compound selected from the group consisting of organic bases, alkali metal bases, alkaline earth metal bases, ammonium bases, and combinations thereof, and where the unsaturated fatty acids are selected from the group consisting of monoenoic acids, polyenoic acids, and mixtures thereof.

15. The VES gelled subterranean formation treatment fluid of claim 13 where:
when the internal breaker is bacteria, the amount of bacteria ranges from about 0.01 to about 20.0 vol %;
when the internal breaker is a saponified fatty acid, the amount of saponified fatty acid ranges from about 50 to about 20,000 ppm; and
when the internal breaker is selected from the group consisting of mineral oils, hydrogenated polyalphaolefin oils, saturated fatty acids, unsaturated fatty acids and combinations thereof, the amount of internal breaker ranges from about 0.1 to about 20 gptg;
all based on the VES gelled fluid.

16. The VES gelled subterranean formation treatment fluid of claim 13 where the internal breaker is a mineral oil and is at least about 99 wt % paraffin.

17. The VES gelled subterranean formation treatment fluid of claim 13 further comprising at least one VES stabilizer selected from the group consisting of alkali metal oxides, alkali metal hydroxides, alkaline earth metal oxides, alkaline earth metal hydroxides, transition metal oxides, transition metal hydroxides, glycols, polyols, and combinations thereof.

18. The VES gelled subterranean formation treatment fluid of claim 13 where in the VES gelled fluid:
the at least one VES is present in an amount of from about 0.5 to 12.0 vol % based on the VES gelled fluid.

19. The VES gelled subterranean formation treatment fluid of claim 13 where only one component is present in the treatment fluid that reduces viscosity, which is the at least one internal breaker.

20. The VES gelled subterranean formation treatment fluid of claim 13 where the internal breaker is present in an oil-soluble internal phase of the water of the VES gelled fluid.

* * * * *